US012565056B1

(12) United States Patent
Ensminger et al.

(10) Patent No.: US 12,565,056 B1
(45) Date of Patent: Mar. 3, 2026

(54) GREETING CARD WITH ROTATABLE POP-UP ASSEMBLY

(71) Applicant: HALLMARK CARDS, INCORPORATED, Kansas City, MO (US)

(72) Inventors: Angela Claire Ensminger, Kansas City, MO (US); Laura Ann Haverkamp, Kansas City, MO (US); Melissa Comba, Tonganoxie, KS (US)

(73) Assignee: Hallmark Cards, Incorporated, Kansas City, MO (US)

( * ) Notice: Subject to any disclaimer, the term of this patent is extended or adjusted under 35 U.S.C. 154(b) by 0 days.

(21) Appl. No.: 19/279,001

(22) Filed: Jul. 24, 2025

Related U.S. Application Data

(60) Provisional application No. 63/733,228, filed on Dec. 12, 2024.

(51) Int. Cl.
*B42D 15/04* (2006.01)
*B42D 15/02* (2006.01)

(52) U.S. Cl.
CPC ......... *B42D 15/045* (2013.01); *B42D 15/022* (2013.01)

(58) Field of Classification Search
CPC ............................ B42D 15/045; B42D 15/022
See application file for complete search history.

(56) References Cited

U.S. PATENT DOCUMENTS 4,525,393 A * 6/1985 DiCostanzo ......... B42D 15/045 428/906.6
9,481,195 B1 * 11/2016 Parkinson ............... G09F 25/00
9,855,784 B1 * 1/2018 Mayer .................. B42D 15/022
9,873,280 B1 * 1/2018 Nelson ................. B42D 15/042
2009/0126239 A1 * 5/2009 Clegg ........................ G09F 1/00 40/407
2011/0078931 A1 * 4/2011 Sapp .......................... G09F 1/00 40/124.03
2013/0086831 A1 * 4/2013 Mayer .................. B42D 15/022 40/124.03
2015/0000167 A1 * 1/2015 Talbot .................. B42D 15/022 383/42
2017/0043607 A1 * 2/2017 Seadler ................ B42D 15/027

(Continued)

OTHER PUBLICATIONS

Hallmark, Butterfly Bouquet Musical 3D Pop-Up Birthday Card with Motion, https://www.hallmark.com/cards/greeting-cards/butterfly-bouquet-musical-3d-pop-up-birthday-card-with-motion-1199ARH1412html. Date accessed: Oct. 3, 2025. Item on sale more than a year before Dec. 12, 2024.

(Continued)

*Primary Examiner* — Gary C Hoge
(74) *Attorney, Agent, or Firm* — Stinson LLP

(57) ABSTRACT

A decorative item including a base, a motor mounted to the base, and a pop-up assembly coupled to the motor. The motor is operable to rotate the pop-up assembly with respect to the base. The pop-up assembly is movable between a collapsed position, in which the pop-up assembly is generally two-dimensional, and an expanded position, in which at least a portion of the pop-up assembly is generally three-dimensional, extends outward from the base, and occupies a volume of space adjacent the base. The decorative item may be a greeting card or any other suitable item intended to be gifted to a recipient.

17 Claims, 29 Drawing Sheets

(56) References Cited

U.S. PATENT DOCUMENTS

| | | | | |
|---|---|---|---|---|
| 2024/0174017 | A1 | 5/2024 | Pilachowski et al. | |
| 2024/0316980 | A1* | 9/2024 | Jiao | B42D 15/045 |

OTHER PUBLICATIONS

Hallmark, Chocolate Cake Musical 3D Pop-Up Birthday Card With Motion, https://www.hallmark.com/cards/greeting-cards/chocolate-cake-musical-3d-pop-up-birthday-card-with-motion-1199ARH1377html. Date accessed: Oct. 3, 2025. Item on sale more than a year before Dec. 12, 2024.

Hallmark, Bunny in Train Musical 3D Pop-Up Easter Card With Motion, https://www.hallmark.com/cards/greeting-cards/bunny-in-train-musical-3d-pop-up-easter-card-with-motion-1199EAZ5106html. Date accessed: Oct. 3, 2025. Item on sale more than a year before Dec. 12 , 2024.

Hallmark, Enjoy Every Beautiful Moment Flower Vase 3D Pop-Up Card, https://www.hallmark.com/cards/greeting-cards/enjoy-every-beautiful-moment-flower-vase-3d-pop-up-card-599WDR1161.html. Date accessed: Oct. 3, 2025 Item on sale more than a year before Dec. 12, 2024.

Hallmark, Flower Bouquet 3D Pop-Up Thinking of You Card, https://www.hallmark.com/cards/greeting-cards/flower-bouquet-3d-pop-up-thinking-of-you-card-699WDR1123.html. Date accessed: Oct. 3, 2025. Item on sale more than a year before Dec. 12, 2024.

Hallmark, Let's Celebrate 3D Pop-Up Birthday Card, https://www.hallmark.com/cards/greeting-cards/lets-celebrate-3d-pop-up-birthday-card-599WDR1148.html. Date accessed: Oct. 3, 2025. Item on sale more than a year before Dec. 12, 2024.

* cited by examiner

FIG. 16
100
WORLD'S BEST
Dad
PRESS HERE

FIG. 20
300
Happy Mother's Day
PRESS HERE

FIG. 29
812
800
BEST
MOM
EVER
808
802
HAPPY MOTHER'S DAY
PRESS
HERE

FIG. 30
800
806
802
LOVE
YOU
ALWAYS
PRESS
HERE

GREETING CARD WITH ROTATABLE POP-UP ASSEMBLY

CROSS-REFERENCE TO RELATED APPLICATIONS

This application is based on and claims priority to U.S. Provisional Application Ser. No. 63/733,228, filed on Dec. 12, 2024, which is incorporated herein by reference in its entirety.

BACKGROUND

When gifting a present or other item to a person, a card is often presented with the gift as a thoughtful way to present a note to the receiver of the gift and to associate the gift with the person giving the gift. The card may include designs, decorative images, and/or text that relate to the reason why the gift is being given. For example, the card may include images or text that relate to a holiday, anniversary, or birthday. Certain types of decorative cards may include a sliceform allowing the card to be mailed in a two-dimensional state and displayed in a three-dimensional state. Further, some cards may include movable elements or sound-emitting speakers.

SUMMARY

A decorative item in accordance with one aspect of the invention described herein includes a base, a motor mounted to the base, and a pop-up assembly coupled to the motor. The motor is operable to rotate the pop-up assembly with respect to the base. The pop-up assembly is movable between a collapsed position, in which the pop-up assembly is generally two-dimensional, and an expanded position, in which at least a portion of the pop-up assembly is generally three-dimensional, extends outward from the base, and occupies a volume of space adjacent the base. The decorative item may be a greeting card or any other suitable item intended to be gifted to a recipient.

The motor may have a drive shaft that is connected to the pop-up assembly. The pop-up assembly may have a shaft coupler that is mounted to the drive shaft.

The pop-up assembly may have a foldable substrate and a decorative card element coupled to the foldable substrate. The foldable substrate having first and second panels with a fold positioned between the first and second panels. The second panel configured to move relative to the first panel about the fold to move the pop-up assembly between the collapsed and expanded positions. The decorative card element is coupled to the foldable substrate. In the collapsed position, the decorative card element is generally two-dimensional and at least partially positioned between the first and second panels. In the expanded position, the decorative card element is generally three-dimensional and extends outward from the first and second panels. The decorative card element may be a sliceform, and the foldable substrate may have first and second tabs each having a slot that receives a portion of the sliceform. A decoration may be mounted to hang from a portion of the sliceform.

The first and second panels may each have top and bottom faces. The top face of the second panel is positioned adjacent and above the top face of the first panel when the pop-up assembly is in the collapsed position, and the top face of the second panel is positioned adjacent and to the side of the top face of the first panel when the pop-up assembly is in the expanded position.

The foldable substrate may have a first sheet and a second sheet adhered to the first sheet. The first and second sheets forming the first and second panels. The first sheet may include the fold, and the second sheet may be separated into two discrete portions positioned on opposite sides of the fold from each other.

The pop-up assembly may include a mounting substrate with the foldable substrate joined to an upper surface of the mounting substrate. Spacers may be mounted to a lower surface of the mounting substrate positioned between the mounting substrate and the base. The first panel of the foldable substrate may be joined to the upper surface of the mounting substrate.

At least a portion of the decorative card element may extend outward from the first and second panels when the pop-up assembly is in the collapsed position. The pop-up assembly may be generally planar and parallel to the base when it is in the collapsed position. A switch may be mounted to the base, electrically coupled to the motor, and configured for actuation to cause the motor to rotate the pop-up assembly.

A light may be mounted to the decorative card element and configured to emit light when the motor rotates the pop-up assembly. A wire may extend from the light to the base.

The decorative item may include a second pop-up assembly coupled to the base. The second pop-up assembly being movable between a collapsed position and an expanded position. The second pop-up assembly may be configured to rotate with respect to the base or be fixedly mounted to the base. The decorative card element of the first pop-up assembly may be configured to rotate around the second pop-up assembly.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

DETAILED DESCRIPTION OF EXEMPLARY EMBODIMENTS

Figure 1:
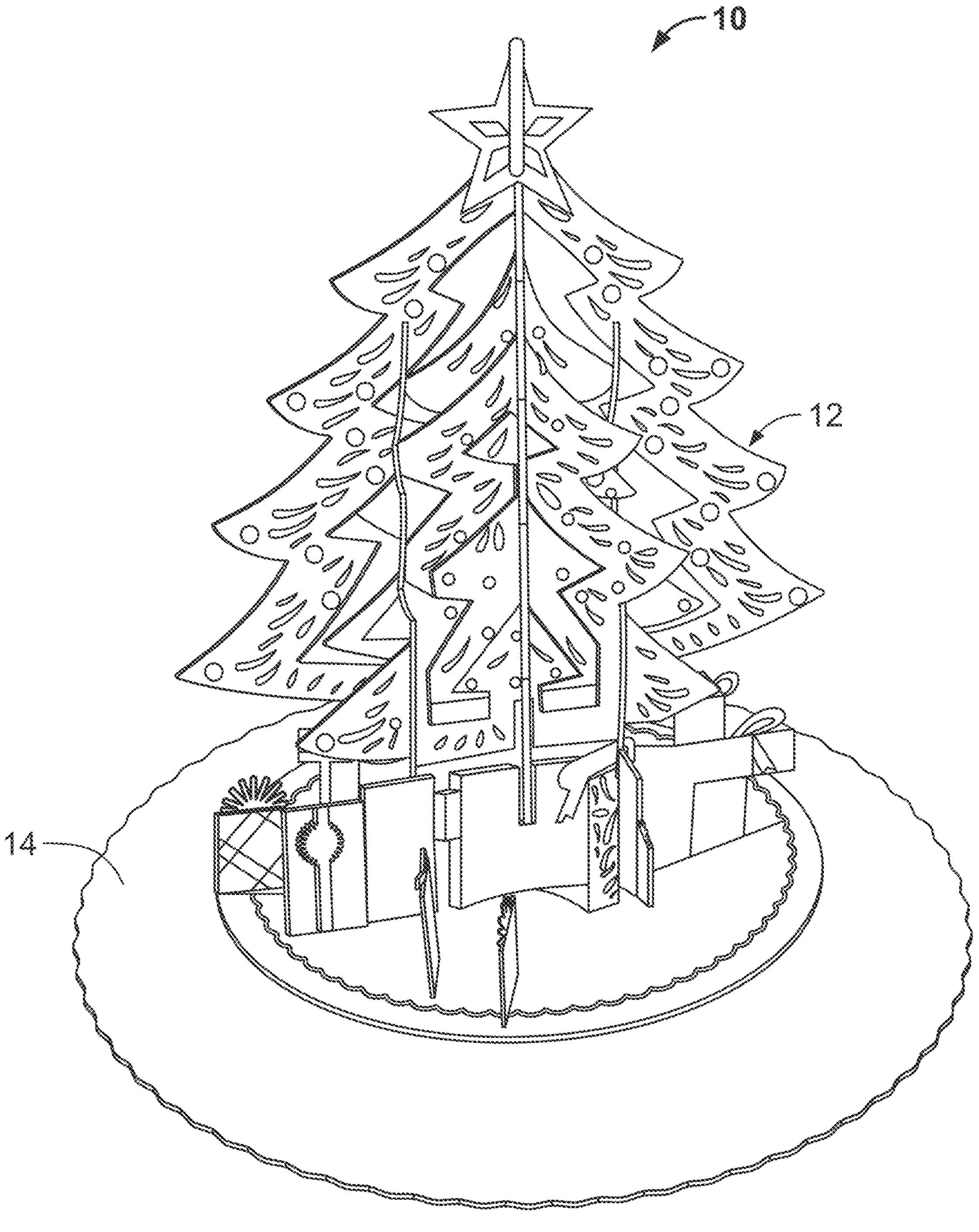
FIG. 1 is a perspective view of a greeting card in accordance with one exemplary embodiment of the invention described herein, wherein a pop-up assembly of the greeting card is shown in an expanded position.
Figure 2:
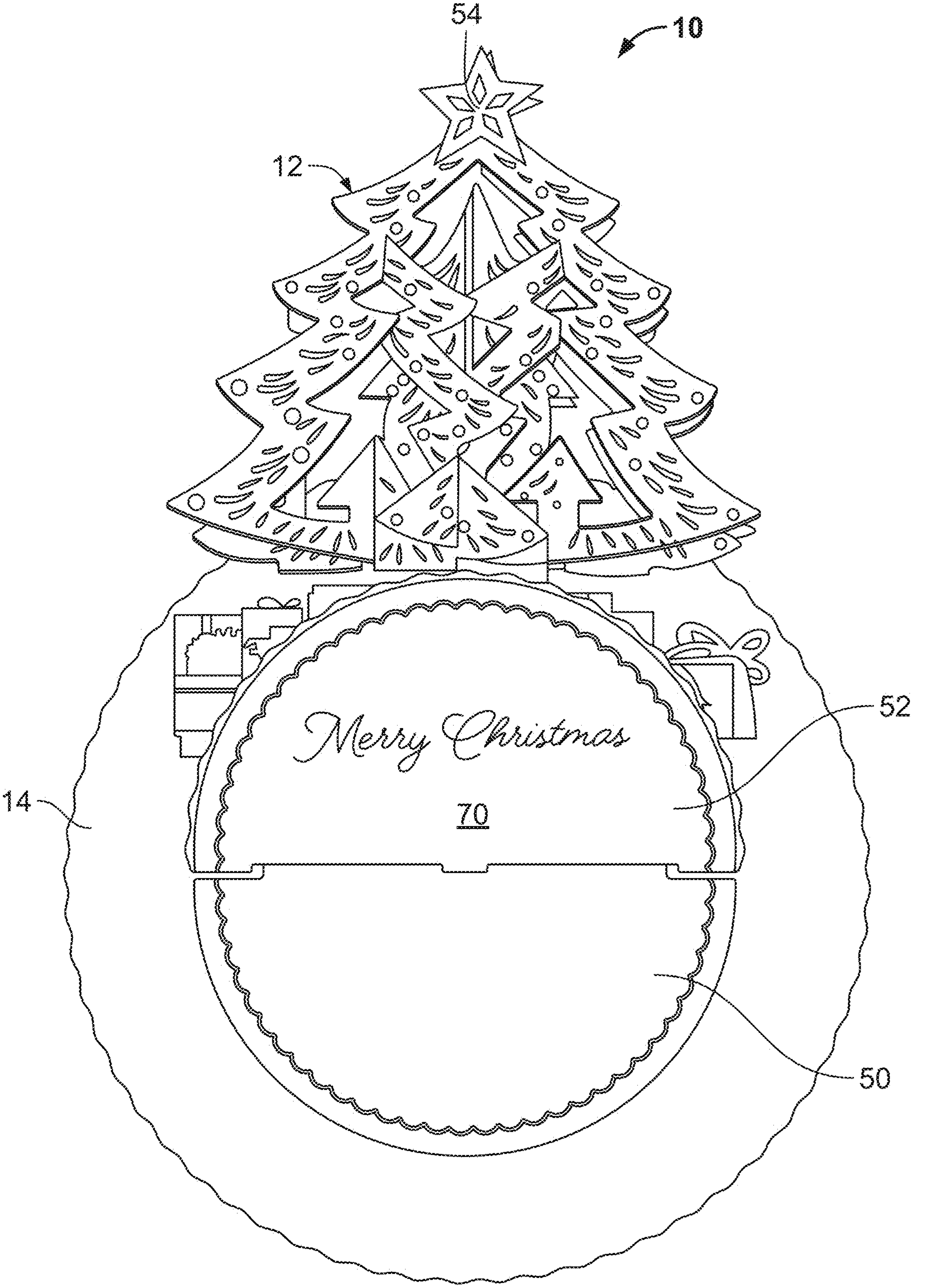
FIG. 2 is a top plan view of the greeting card of FIG. 1 showing the pop-up assembly in a collapsed position.

A decorative item in accordance with one exemplary embodiment of the invention described herein is identified generally as 10 in FIGS. 1 and 2. The decorative item 10 is a greeting card with a pop-up assembly 12 that is movable between the expanded position shown in FIG. 1 and the collapsed position shown in FIG. 2. The decorative item 10 may be placed in an envelope and mailed or delivered to a recipient when in the collapsed position, and it may be displayed by the recipient in the expanded position. As described in more detail below, the decorative item 10 includes a motor connected to the pop-up assembly 12 that is configured to continuously rotate the entire pop-up assembly 12 when a user actuates a switch of the decorative item 10. The decorative item 10 may also include a speaker that plays music or a recorded message as the pop-up assembly 12 rotates. Although the decorative item 10 is shown and described as a greeting card, any type of decorative item having a rotating pop-up assembly is within the scope of the invention described herein.

As shown in FIGS. 1 and 2, the decorative item 10 includes a base 14 that is configured to be placed on a tabletop or other surface for supporting the pop-up assembly 12. The base 14 is shown as being circular, but may be any desired shape. The base 14 has a diameter configured to provide a stable platform for the pop-up assembly 12. In at least some embodiments, the diameter or width of the base 14 is greater than the diameter or width of the pop-up assembly 12.

Figure 3:
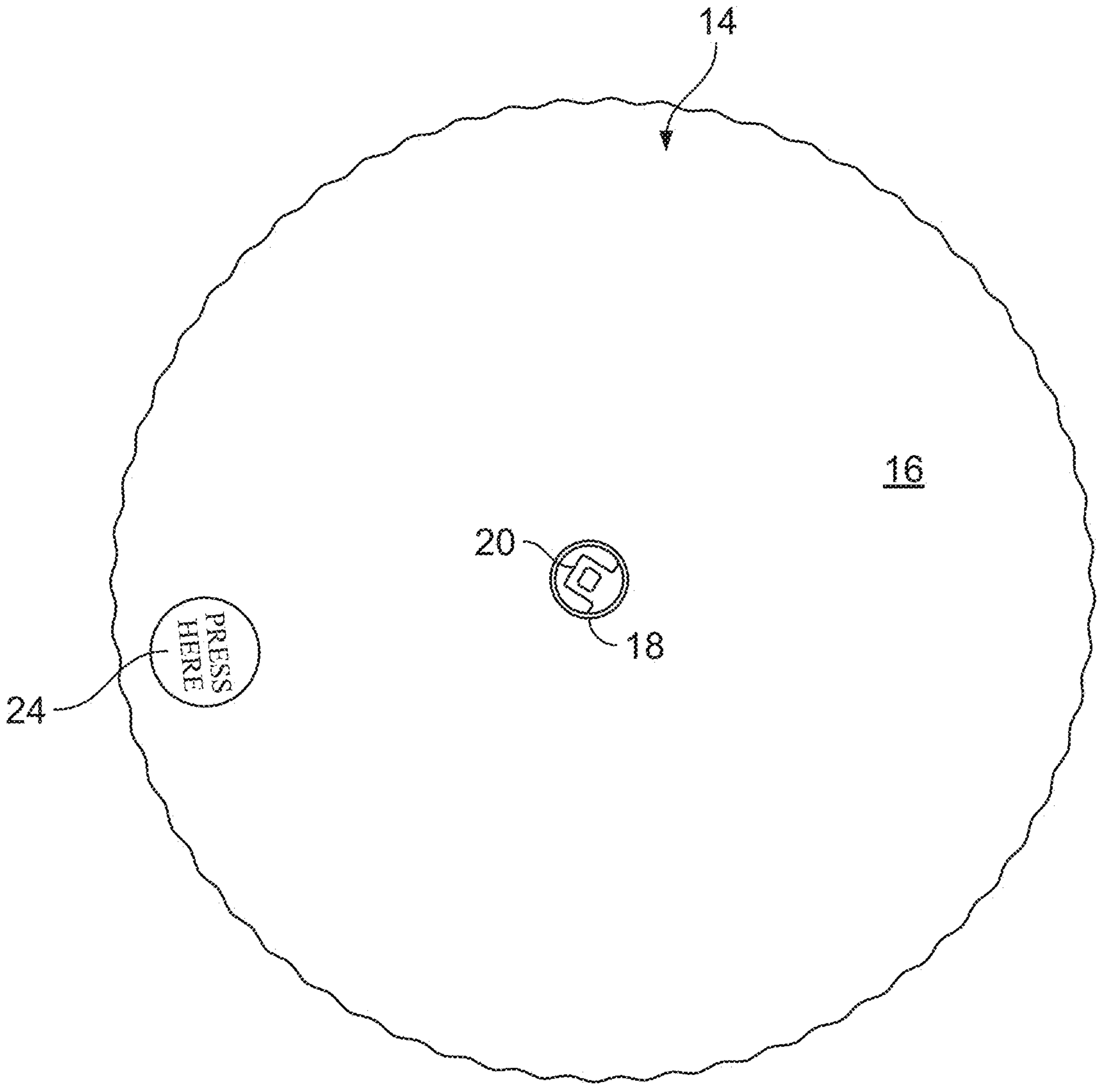
FIG. 3 is a top plan view of a base of the greeting card of FIG. 1.
Figure 4:
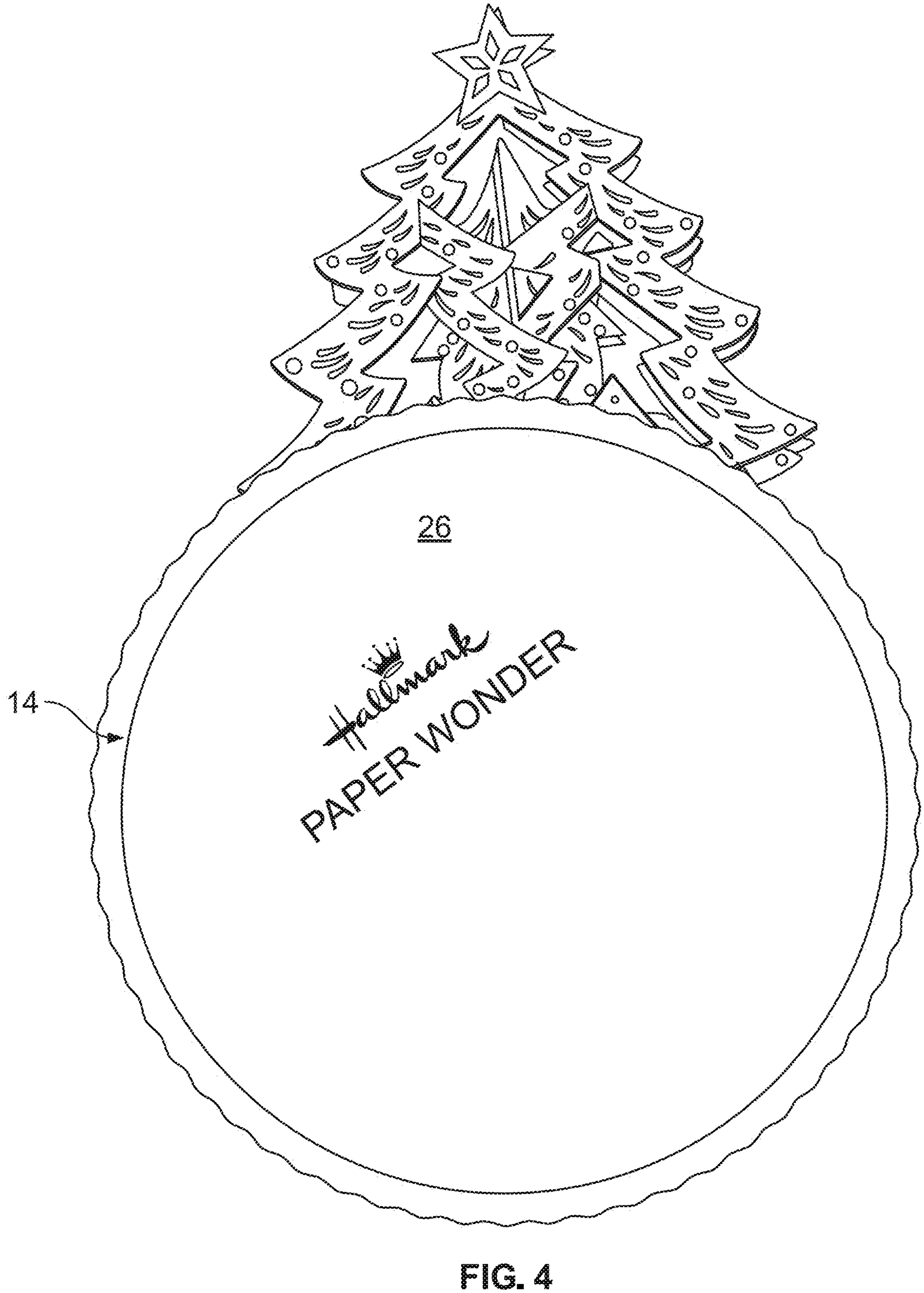
FIG. 4 is a bottom plan view of the base shown in FIG. 3.

Referring to FIG. 3, the base 14 has an upper wall 16 with an opening 18 at approximately a center of the upper wall 16. A drive shaft 20 of the motor 22 (FIG. 5) extends through the opening 18. The upper wall 16 also includes a visual indicator 24 consisting of the text "PRESS HERE" which may be printed on the upper wall 16. As described in more detail below, a switch 42 (FIG. 5) is positioned beneath the visual indicator 24 such that when a user presses on the visual indicator 24, the pop-up assembly 12 continuously rotates and a speaker 40 (FIG. 5) plays music until the visual indicator 24 is pressed again. FIG. 4 shows a lower surface 26 of the base 14, which is configured to support the base 14 on a tabletop, countertop, or other surface for display.

Figure 5:
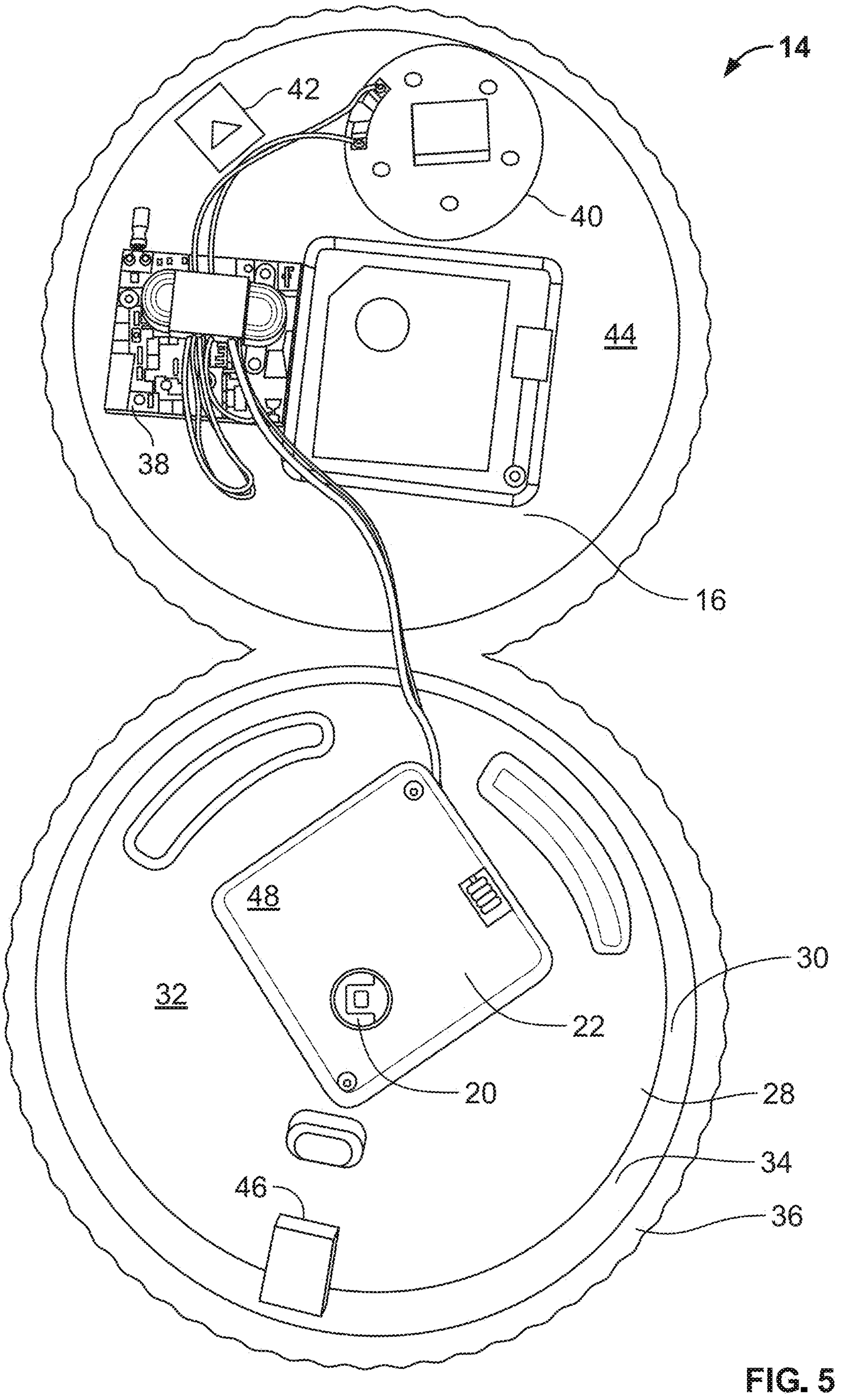
FIG. 5 is a perspective view showing components positioned inside of the base shown in FIG. 3.

Turning to FIG. 5, the base 14 includes a housing 28 with a cavity 30 within which the motor 22 is mounted. The housing 28 has a bottom wall 32, a side wall 34 extending upward from a peripheral edge of the bottom wall 32, and a flange 36 extending laterally outward from the top of the side wall 34 away from the cavity 30. The upper wall 16 is joined to the flange 36 during assembly. For example, the upper wall 16 may be adhered to the flange 36. The lower surface 26, shown in FIG. 4, is formed from a piece of decorative cardstock adhered to an exterior side of the bottom wall 32. The upper wall 16 may be formed from paper or cardstock, while the housing 28 may be formed from a rigid plastic or polymeric material.

The following components are positioned within the cavity 30: the motor 22, a circuit board 38, a speaker 40, and a switch 42. Wires electrically couple each of the motor 22, speaker 40, and switch 42 to the circuit board 38. The circuit board 38 includes a controller that causes actuation of the motor 22 and speaker 40 when the switch 42 is pressed. When the switch 42 is pressed again, the controller stops actuation of the motor 22 and speaker 40. Batteries are also mounted on the circuit board 38 to power the controller, motor 22, and speaker 40.

During assembly, the motor 22, circuit board 38, speaker 40, and switch 42 may be mounted to an interior surface 44 of the upper wall 16 using any suitable means, such as tape or adhesive. The upper wall 16 may then be adhered to the flange 36, as described above. The interior surface 44 may have visual indicators consisting of outlines of the motor 22, circuit board 38, speaker 40, and switch 42 to assist an assembler in mounting the components on the upper wall 16. Spacers, one of which is identified as 46, may be positioned between each of the circuit board 38, speaker 40, and switch 42, on the one hand, and bottom wall 32, on the other hand. The motor 22 may be mounted to the bottom wall 32 with tape or adhesive when it is placed in the cavity 30.

The motor 22 includes a housing 48 that is mounted to the base 14 and the drive shaft 20 that extends outward from the housing 48. An upper surface of the drive shaft 20 is configured to mount to the pop-up assembly 12, as described in more detail below.

Figure 6:
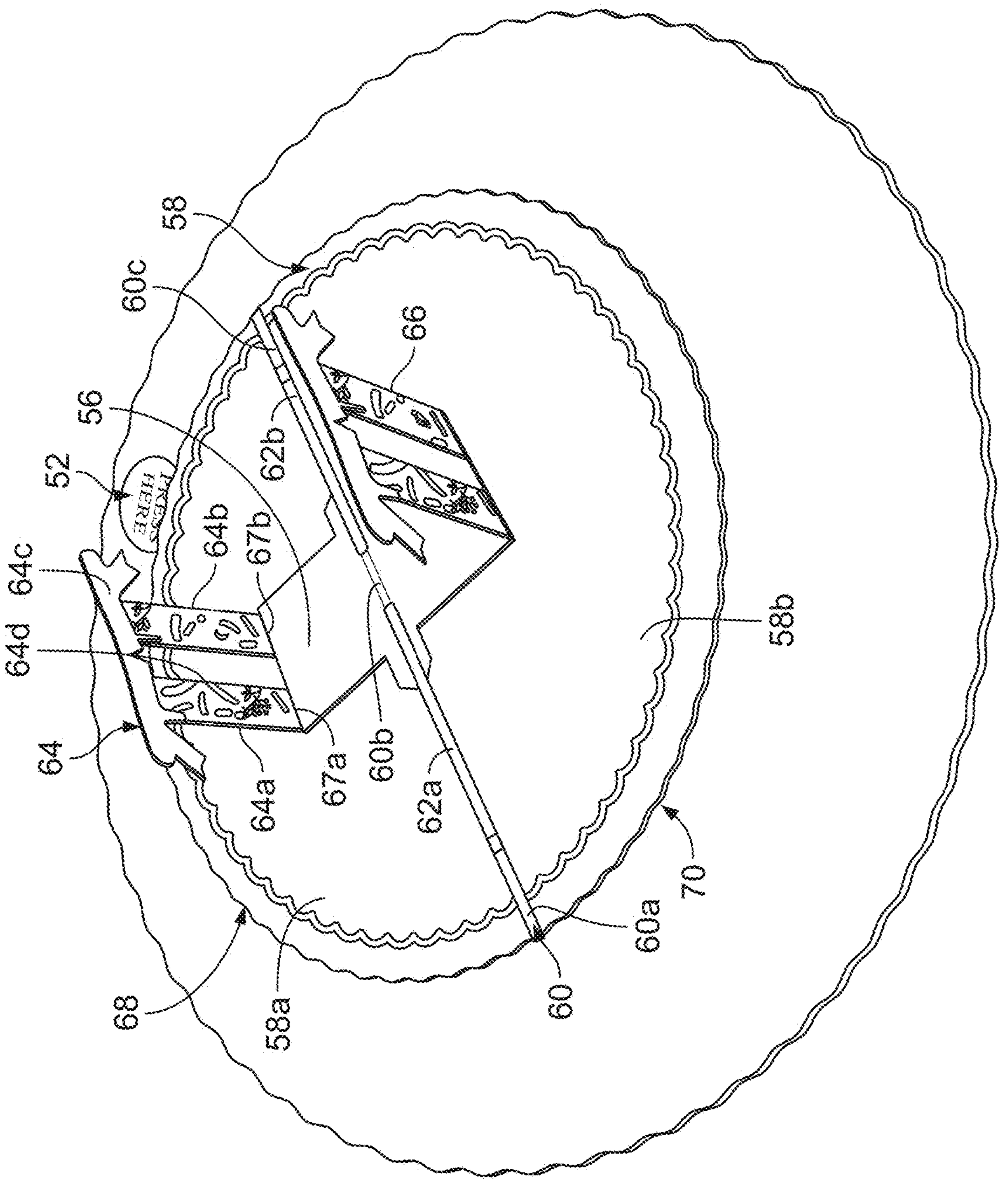
FIG. 6 is a perspective view of a foldable substrate of the pop-up assembly shown in FIG. 1.
Figure 7:
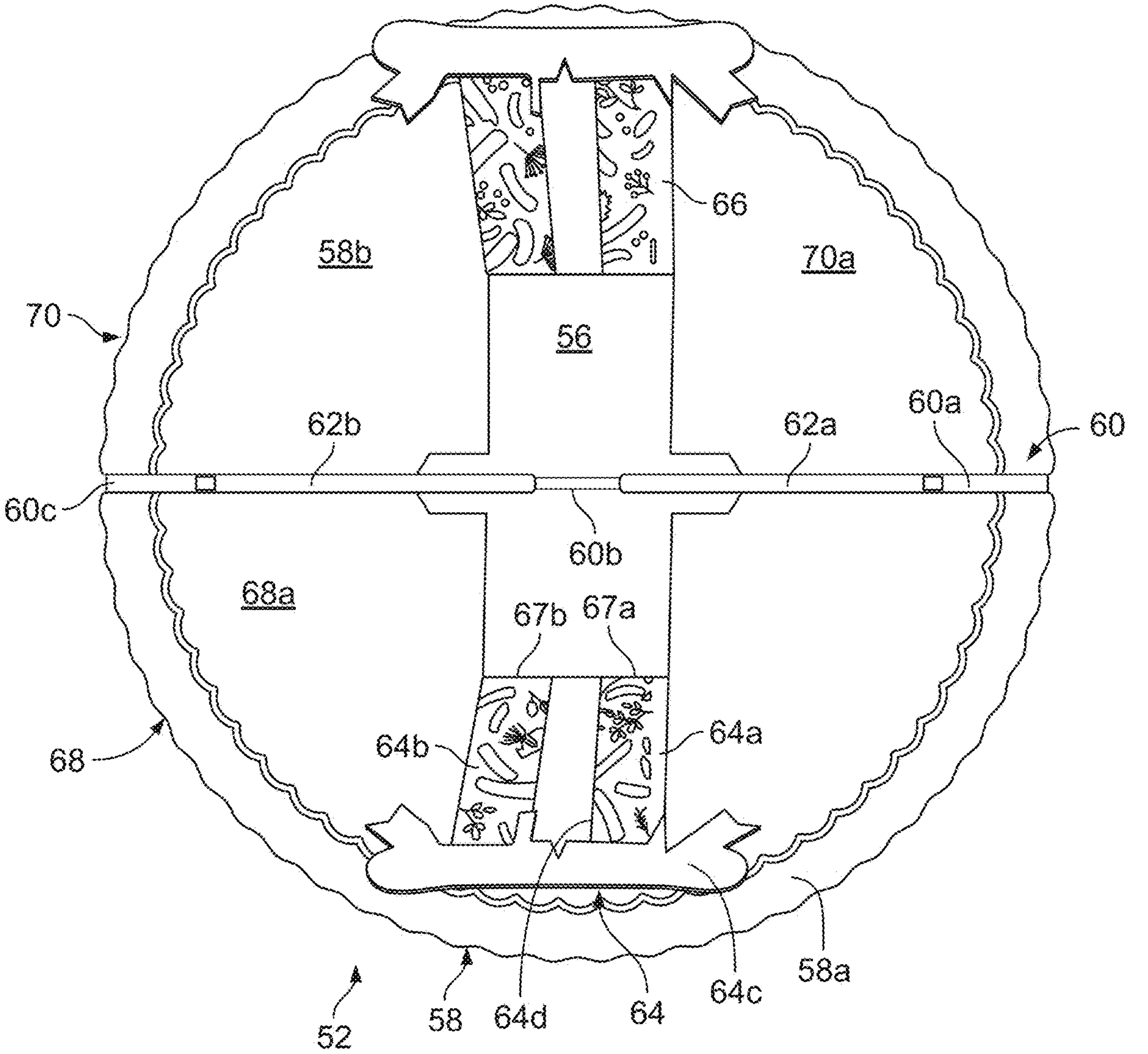
FIG. 7 is a top plan view of the foldable substrate of FIG. 6 showing the foldable substrate in the expanded position.

Referring back to FIG. 2, the pop-up assembly 12 broadly includes a mounting substrate 50, a foldable substrate 52, and a decorative card element 54, which is shown as a sliceform. As shown in FIGS. 6 and 7, the foldable substrate 52 includes a first sheet 56 and a second sheet 58 adhered to the first sheet 56. The first sheet 56 is generally circular and includes a fold 60 extending through the center of the circular first sheet 56. At the fold 60, slits 62*a,b* are cut through the first sheet 56 to separate the fold 60 into three segments 60*a-c*. Segments 60*a* and 60*c* are positioned at the peripheral edge of the first sheet 56 on opposite sides, and segment 60*b* is positioned at the center of the first sheet 56. The slits 62*a,b* may be omitted, however, and the fold 60 may extend across the entire sheet unbroken.

The second sheet 58 is separated into two discrete portions 58*a* and 58*b* positioned on opposite sides of the fold 60. The portions 58*a* and 58*b* are each semi-circular and adhered to an upper surface of the first sheet 56 to substantially cover the upper surface of the first sheet 56. The portion 58*a* has a first tab 64, and the portion 58*b* has a second tab 66. Since the first and second tabs 64, 66 are substantially the same, only the first tab 64 is described in detail herein. The first tab 64 has two legs 64*a,b* extending from a midsection of the portion 58*a* and a crossbar 64*c* connecting upper portions of the legs 64*a,b*. The legs 64*a,b* are spaced apart to define a slot 64*d* between them. The first tab 64 may be formed integrally with the remainder of the first portion 58*a* or formed separately and joined to the first portion 58*a*. In some embodiments, the first portion 58*a* and first tab 64 may be cut from a single sheet of material. The first tab 64 is foldable with respect to the remainder of the first portion 58*a* at folds 67*a,b* defined where the legs 64*a,b* extend from the remainder of the first portion 58*a*. The folds 67*a,b* are oriented to be parallel to the fold 60 of the first sheet 56. This orientation places the first tab 64 in a plane that is parallel to the fold 60 when the first tab 64 extends upward perpendicular to the remainder of the first portion 58*a*, as shown in FIG. 6. The first tab 64 is generally oriented at a midsection of the first portion 58*a* spaced approximately equidistant from an edge of the first portion 58*a* adjacent the fold 60 to a peripheral edge of the first portion 58*a* along an imaginary line passing through the center of the first sheet 56 perpendicular to the fold 60. An imaginary line passing through the center of the first sheet 56 perpendicular to the fold 60 further bisects the first tab 64 with equal portions of the first tab 64 being on each side of such line. As noted, the second tab 66 has substantially the same structure as the first tab 64. The second tab 66 is generally a mirror image of the first tab 64 relative to the fold 60.

Figure 8:
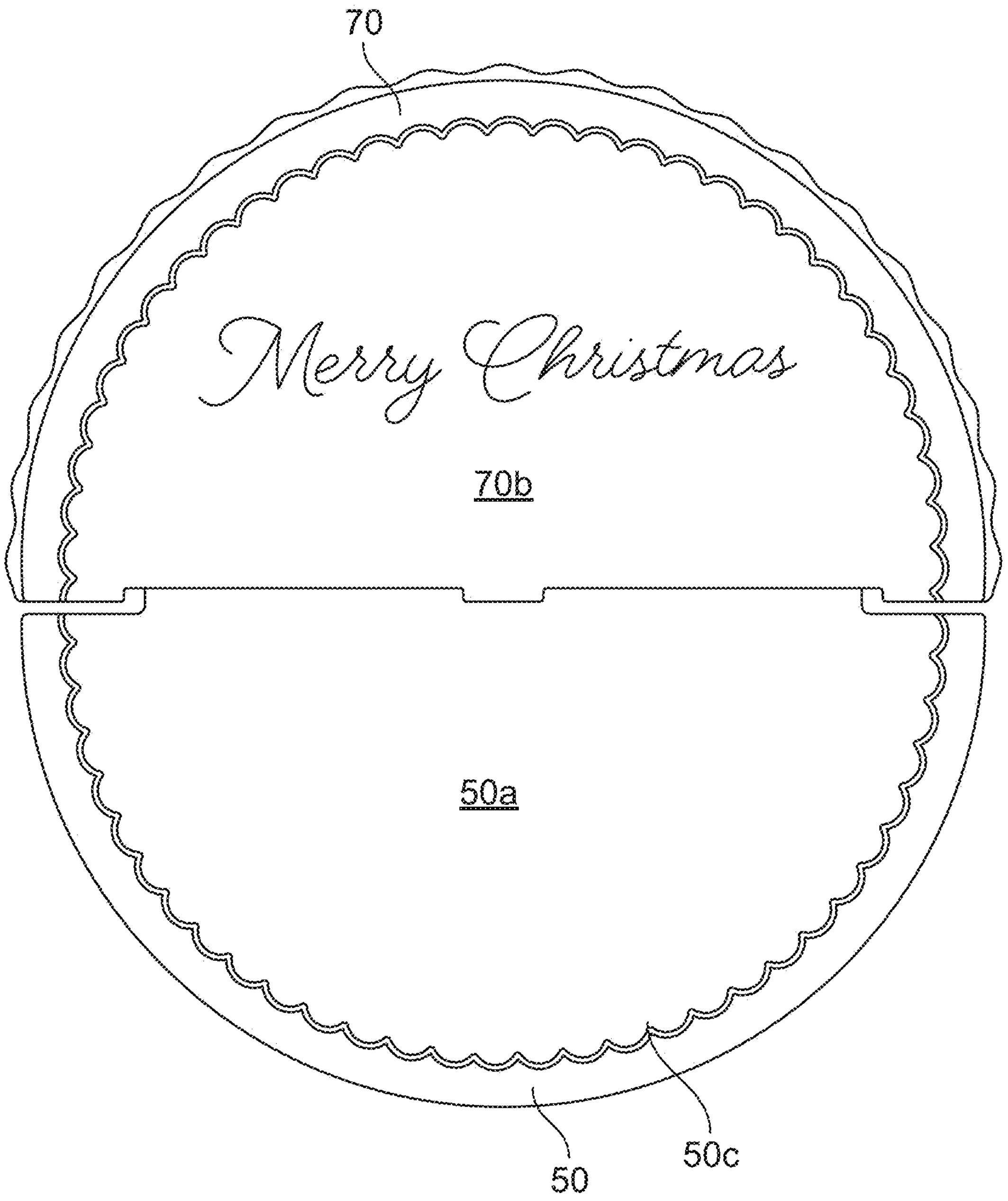
FIG. 8 is a top plan view of the foldable substrate of FIG. 6 showing the foldable substrate in the collapsed position.

The first and second sheets 56 and 58 form first and second panels 68 and 70 with the fold 60 positioned between the first and second panels 68 and 70. The second panel 70 is configured to move relative to the first panel 68 about the fold 60 to move the pop-up assembly 12 between the expanded position, shown in FIGS. 6 and 7, and the collapsed position shown in FIG. 8. As shown in FIG. 8, when the pop-up assembly 12 is in the collapsed position, the second panel 70 is folded over to substantially cover the first panel 68.

The first panel 68 has a top face 68*a* (FIG. 7) and a bottom face 68*b* (FIG. 9), and the second panel 70 has a top face 70*a* (FIG. 7) and a bottom face 70*b* (FIG. 8). The top face 70*a* of the second panel 70 is positioned adjacent and above the top face 68*a* of the first panel 68 when the pop-up assembly is in the collapsed position shown in FIG. 8. The top face 70*a* of the second panel 70 is positioned adjacent and to the side of the top face 68*a* of the first panel 68 when the pop-up assembly is in the expanded position shown in FIG. 7. The top faces 68*a* and 70*a* may be substantially planar when in the expanded position shown in FIG. 7. As shown in FIG. 8, the bottom face 70*b* of the second panel 70 may have a printed message (e.g., Merry Christmas) and other decorative elements printed thereon.

Figure 9:
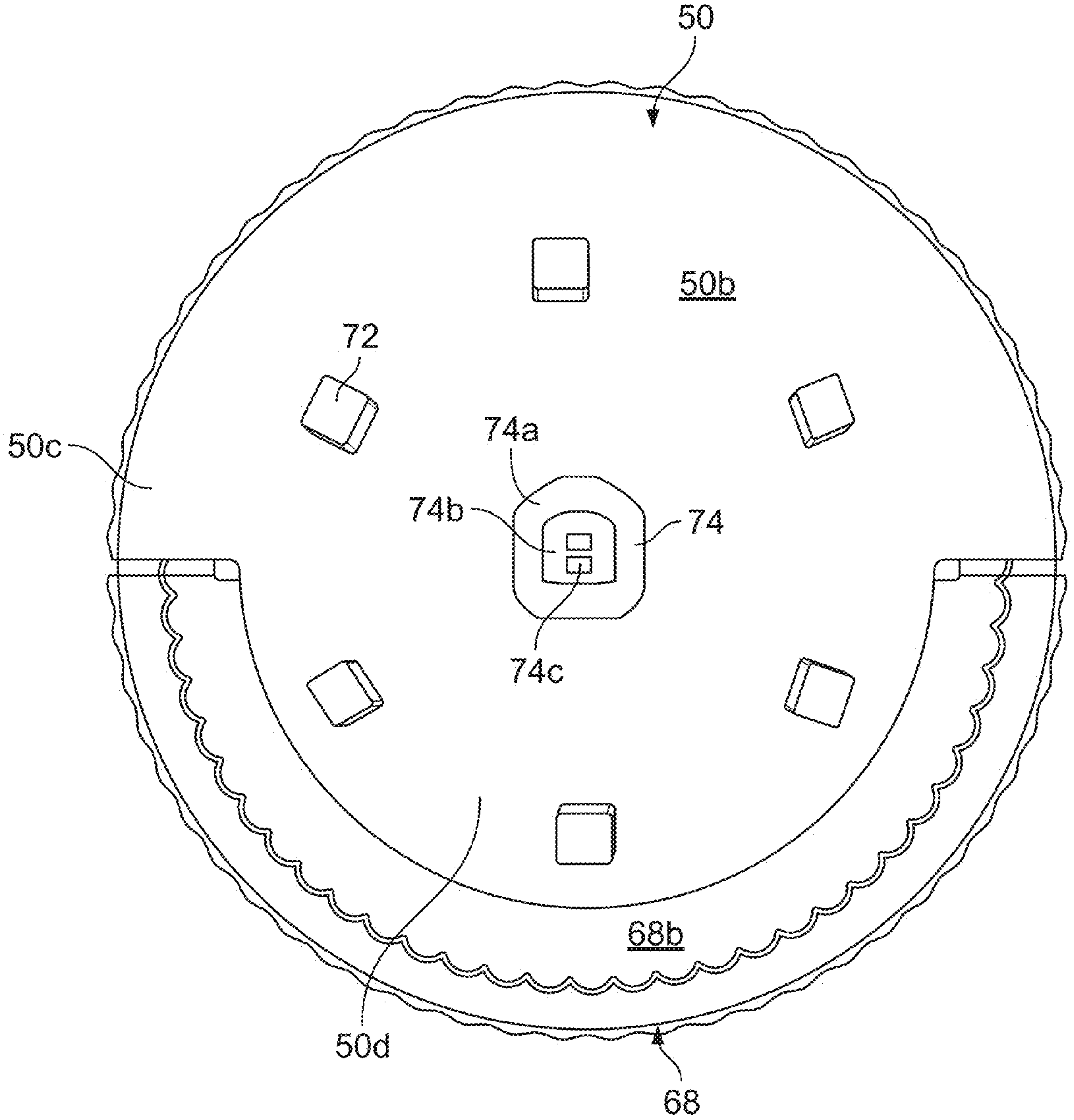
FIG. 9 is a bottom plan view of the foldable substrate and a mounting substrate of the pop-up assembly shown in FIG. 1.

The mounting substrate 50 is described herein with reference to FIGS. 8 and 9. The mounting substrate 50 has an upper surface 50*a*, shown in FIG. 8, and a lower surface 50*b*, shown in FIG. 9. The first panel 68 of the foldable substrate 52 is joined to the upper surface 50*a* of the mounting substrate 50, while the second panel 70 is not joined to the mounting substrate 50 so that the second panel 70 is free to fold over the first panel 68. The first panel 68 may be adhered to the mounting substrate 50 or joined to it using any other suitable means. The mounting substrate 50 has a first half 50*c* that is semi-circular and positioned below the second panel 70 when the second panel 70 is folded to the position shown in FIG. 7. The mounting substrate 50 further has a second half 50*d*, shown in FIG. 9, to which the first panel 68 of the foldable substrate 52 is joined. The first half 50*c* has generally the same radius or width as the second panel 70, such that when the second panel 70 is folded to the position shown in FIG. 8, the second panel 70 and first half 50*c* together form a full circle. The first half 50*c* may also present a space for a user to write a message to a recipient of the decorative item 10. The second half 50*d*, as shown in FIG. 9, has a radius or width that is slightly less than the first half 50*c* and the first panel 68 such that a portion of the first panel extends radially beyond the peripheral edge of the second half 50*d*.

As shown in FIG. 9, spacers, one of which is identified as 72 are mounted to the lower surface 50*b* of the mounting substrate 50. The spacers 72 are circumferentially spaced from each other and are also each spaced equidistant from a center of the combined mounting substrate 50 and foldable substrate 52. The spacers 72 may be formed from a resilient material, such as foam. The spacers 72 are positioned between the lower surface 50*b* of the mounting substrate 50 and the upper wall 16 of the base 14 (FIG. 3) when the mounting substrate 50 is mounted to the drive shaft 20. The spacers 72 may facilitate rotation of the pop-up assembly 12 relative to the base 14 by minimizing contact between the pop-up assembly 12 and base 14 and any friction associated therewith.

Figure 10:
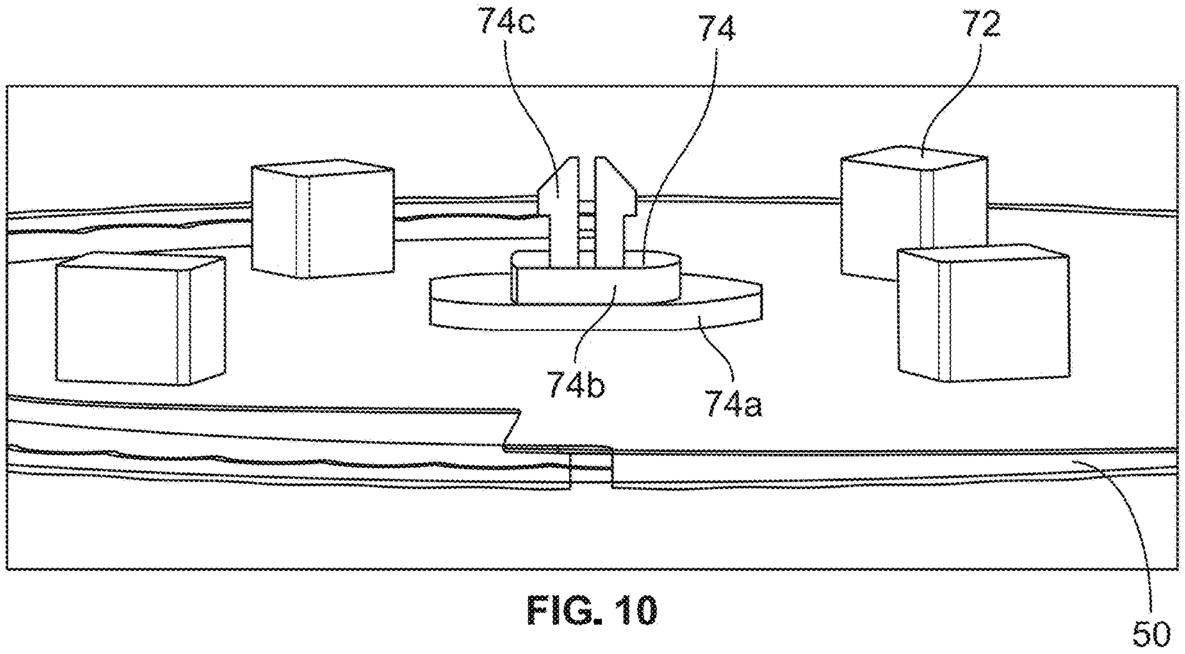
FIG. 10 is a close-up view of a shaft coupler of the mounting substrate shown in FIG. 9.
Figure 11:
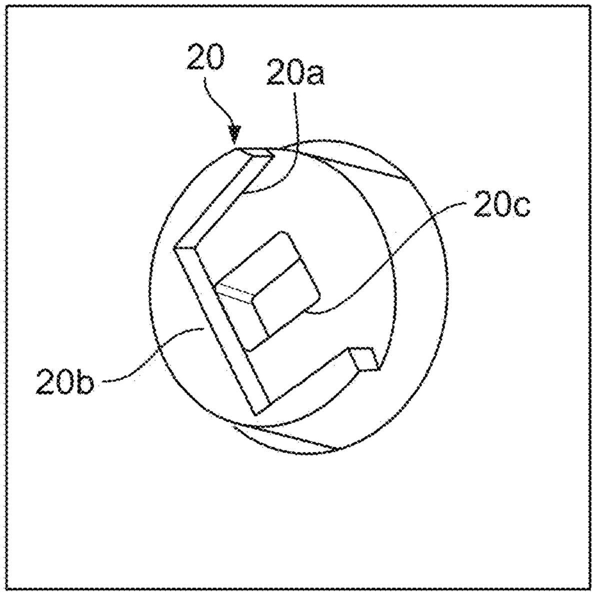
FIG. 11 is a close-up view of a motor drive shaft mounted to the base shown in FIG. 5.

Referring to FIGS. 9 and 10, a shaft coupler 74 is mounted to the lower surface 50*b* of the mounting substrate 50. The shaft coupler 74 is generally positioned at a center of the combination of the mounting substrate 50 and the foldable substrate 52. The shaft coupler 74 includes a mounting plate 74*a* that is joined to the mounting substrate 50, a keyed surface 74*b* extending outward from the mounting plate 74*a*, and a pair of clips 74*c* extending outward from the keyed surface 74*b*. The shaft coupler 74 attaches to an upper portion of the drive shaft 20, which is shown in FIG. 11. The drive shaft 20 includes a recess **20*a* formed in its upper surface 20*b*. The recess 20*a* is shaped to match the keyed surface 74*b* of the shaft coupler 74. An opening 20*c* positioned within the recess 20*a* is sized to receive the clips 74*c* for mounting the pop-up assembly 12 to the drive shaft 20. The clips 74*c* may be configured to flex toward and away from each other. When the clips 74*c* are pressed into the opening 20*c*, the clips 74*c* may flex toward each other allowing them to be inserted through the opening 20*c*. When the clips 74*c* are positioned in the opening 20*c*, they may flex back away from each other so that surfaces of the clips 74*c* engage surfaces surrounding the opening 20*c* to impede removal of the clips 74*c* from the opening 20*c***.

Figure 12:
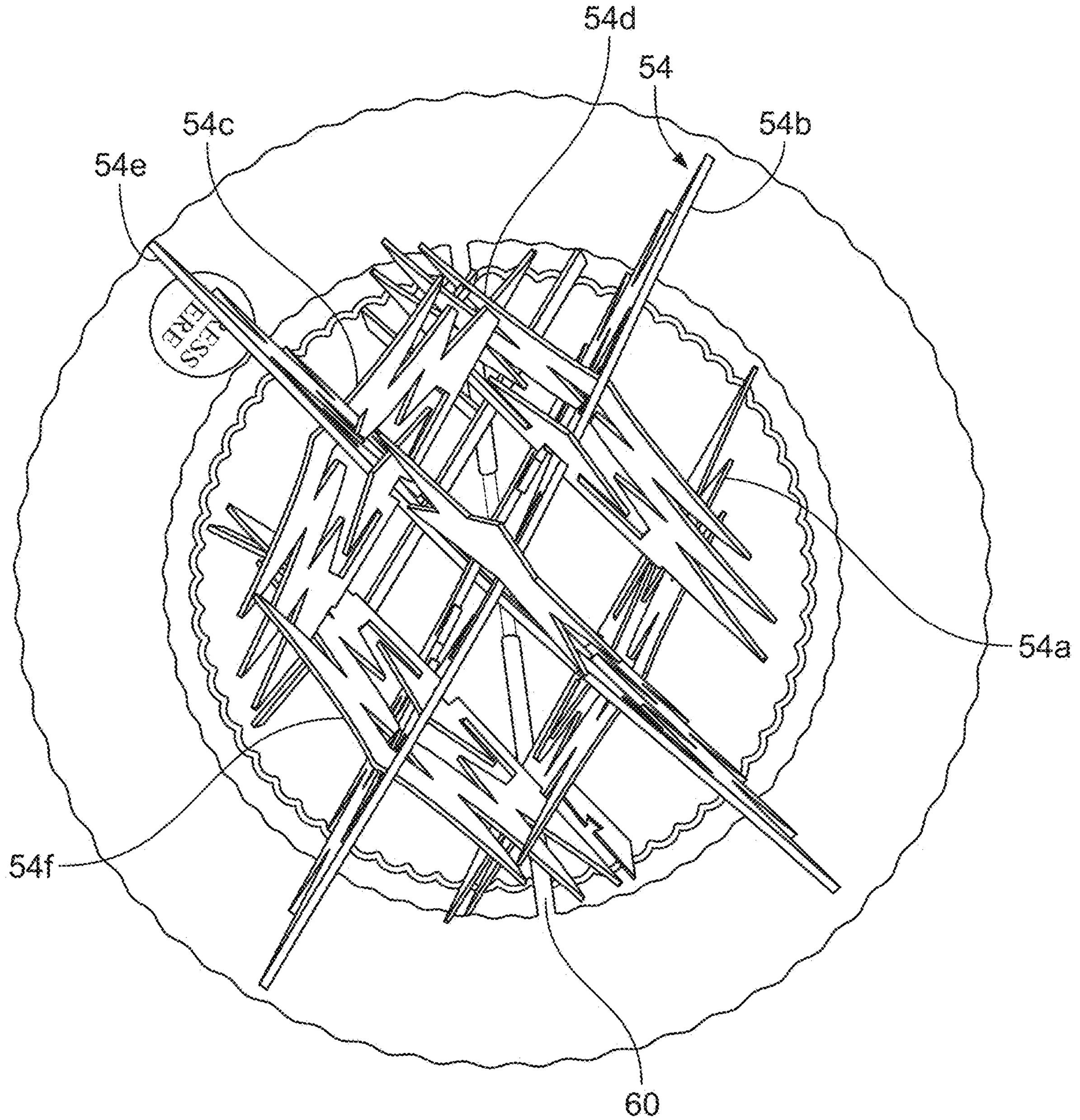
FIG. 12 is a top plan view of a sliceform of the pop-up assembly shown in FIG. 1.

As shown in FIG. 12, the decorative card element 54 includes three sheets of material **54*a-c* that are spaced apart from each other and generally planar to each other when the pop-up assembly 12 is in the expanded position. Each of the sheets 54*a-c* is also positioned at approximately a 45 degree angle to the fold 60 when the pop-up assembly 12 is in the expanded position. The decorative card element 54 further includes three additional sheets of material 54*d-f* that are spaced apart from each other and generally planar to each other when the pop-up assembly 12 is in the expanded position. Each of the sheets 54*d-f* is positioned at approximately a 45 degree angle to the fold 60 when the pop-up assembly 12 in the expanded position, and the sheets 54*d-f* are generally perpendicular to the sheets 54*a-c* when in this position. As generally shown in FIG. 13, each of the sheets 54*a-c* interlocks with each of the sheets 54*d-f* at interlocking regions, one of which is identified as 76 in FIG. 13**.

Figure 13:
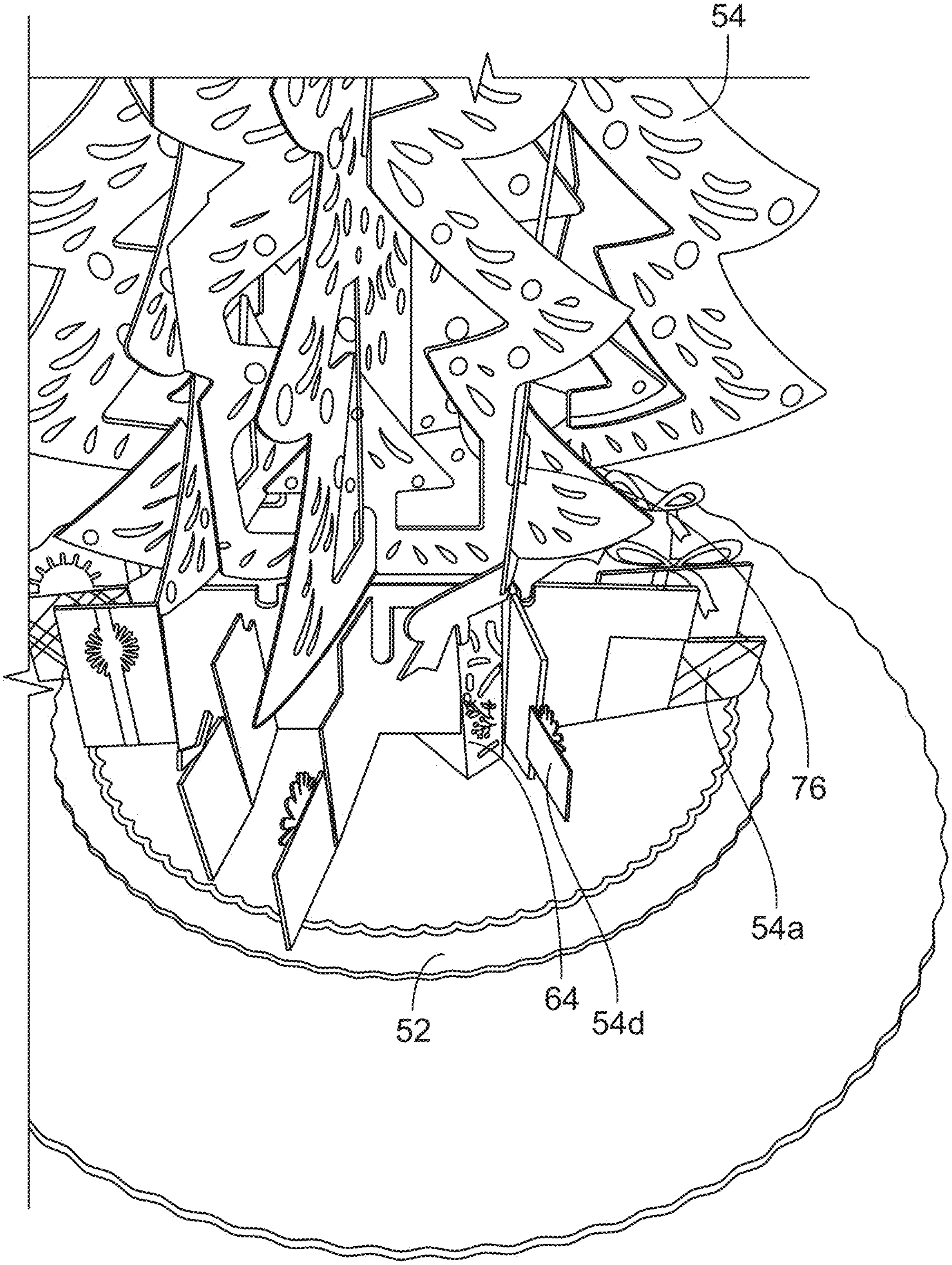
FIG. 13 is a perspective view of a portion of the sliceform shown in FIG. 12.

Further as shown in FIG. 13, lower portions of the interlocked sheets **54*a* and 54*d* extend through the slot 64*d* (FIG. 7) of the tab 64. On the opposite side of the pop-up assembly 12, lower portions of the interlocked sheets 54*c* and 54*f* extend through the slot of the tab 66. This engagement between the decorative card element 54 and the tabs 64 and 66 mounts the decorative card element 54 to the foldable substrate 52. The engagement also allows the decorative card element 54 to move between the three-dimensional shape shown in FIG. 1 to the generally two-dimensional shape shown in FIG. 2 when the second panel 70 of the foldable substrate is folded over the first panel 68 as shown in FIGS. 2 and 8**.

Each of the sheets **54*a-f* of the decorative card element 54 may include more than one discrete pieces of material (e.g., a sheet may have discrete pieces vertically spaced from each other each interlocked with one or more of the other sheets). It is also within the scope of this disclosure for the decorative card element 54 to have more or less than the number of sheets described, and the sheets may be at different angles with respect to the fold 60 and each other than as shown and described herein. In the embodiment shown in the drawings, it is apparent that the decorative card element 54** is cut and printed to resemble a Christmas tree having presents beneath it. The tree extends upward from its base in a generally conical or tapered manner when in the expanded position.

Figure 14:
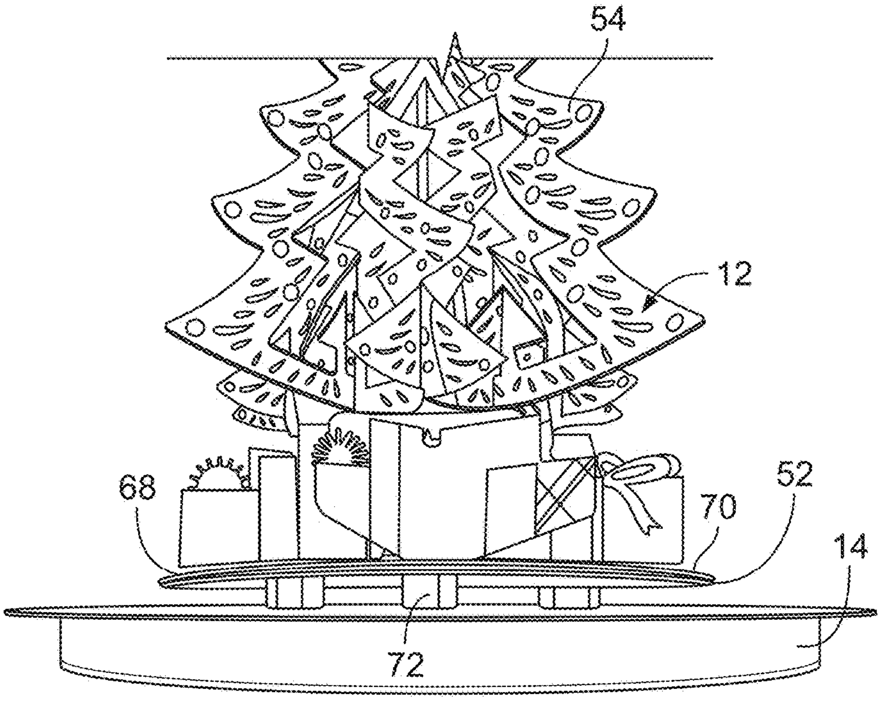
FIG. 14 is a front elevational view of the greeting card shown in FIG. 1 showing the pop-up assembly in the expanded position.

FIG. 14 shows the pop-up assembly 12 in the expanded position with the decorative card element 54 in its three-dimensional shape. In this position, the decorative card element 54 extends upward or outward from the first and second panels 68 and 70 of the foldable substrate 52 and occupies a volume of space adjacent or above the base 14. The spacers 72 are also shown in FIG. 14 spacing the foldable substrate 52 a distance above the base 14.

Figure 15:
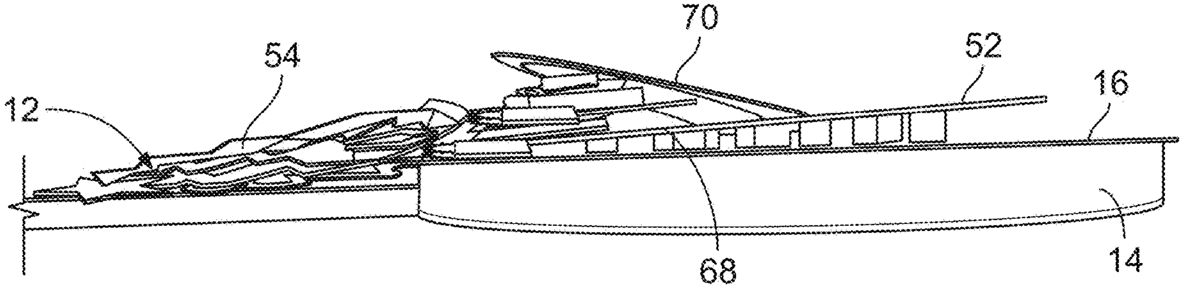
FIG. 15 is a front elevational view similar to FIG. 14 showing the pop-up assembly in the collapsed position.

FIG. 15 shows the pop-up assembly 12 in the collapsed position with the decorative card element 54 in its two-dimensional shape. In this position, the decorative card element 54 is partially positioned between the first and second panels 68 and 70 of the foldable substrate 52, and a portion of the decorative card element 54 extends radially outward from the outer edge of the first and second panels 68 and 70 and the base 14. The pop-up assembly 12 is also generally planar and parallel to the upper wall 16 of the base 14 when it is in the collapsed position. Due to the thickness of the materials, the pop-up assembly 12 may not be in exact parallel alignment with the upper wall 16 of the base 14 when in the collapsed position, but it is nearly parallel or within 25 degrees of being in exact parallel alignment. Further, even though the pop-up assembly 12 has a thickness when it is in the collapsed position (e.g., due to the thickness of the sheets making up the pop-up assembly and sheets being stacked on each other), the term "generally two-dimensional" as used herein covers the pop-up assembly 12 as shown in FIG. 15. Notably, when the decorative card element 54 is folded to the collapsed position, it resembles a two-dimensional Christmas tree (as best seen in FIG. 2) having a generally triangular shape that extends outward from the foldable substrate 52 and is visible to a user.

As the pop-up assembly 12 is moved from the expanded position shown in FIG. 14 to the collapsed position shown in FIG. 15, the movement of the second panel 70 and the tab 66 thereon gradually collapses the sheets **54*a-f* of the decorative card element 54 so that they move from, in the expanded position, being spaced apart from each other and positioned at angles with respect to each other to, in the collapsed position, being adjacent or abutting each other and being substantially planar and parallel to each other. The tabs 64 and 66 also fold down to be generally parallel and planar with the remainder of the foldable substrate 52**.

As the pop-up assembly 12 moves back from the collapsed position shown in FIG. 15 to the expanded position shown in FIG. 14, the tabs 64 and 66 gradually move from being parallel to the remainder of the foldable substrate 52 to the position shown in FIG. 6. As the tabs 64 and 66 move, they gradually pull the decorative card element 54 up from its two-dimensional state to its three-dimensional state.

Although a specific structure and mechanism is described above and shown in the drawings for moving the pop-up assembly 12 between the collapsed and expanded positions, the pop-up assembly 12 may be constructed to operate in any manner that causes it to move between a collapsed two-dimensional position and an expanded three-dimensional position. For example, the decorative item 10 may include any type of foldable substrate that includes any two panels that can move relative to one another about a fold from a folded or closed state to an open state. For example, the decorative item 10 may be a greeting card, a magazine, a book, and the like. The two panels may be connected to one another at a binding, in some aspects. In other aspects, the two panels may comprise a unitary panel having a crease from one edge to an opposing edge. There may be more than two panels. For example, a unitary panel may be divided into three, four, or more subpanels that are each separated from adjacent subpanels by a crease. As used herein, the term "fold" refers to a segment about which two adjacent panels move relative to one another. For example, one of the panels may rotate about the fold.

Further, any type of "paper mechanics" may be employed to move the pop-up assembly 12 between the collapsed and expanded positions. As known to one skilled in the art, the term "paper mechanics" refers to a category of devices applied to foldable articles that cause motion upon opening of the foldable article. Although some paper mechanics are constructed from paper materials (e.g., paper strips), other paper mechanics are constructed from other materials (e.g., plastics, metal, wire, etc.).

In addition, as described above, the decorative card element 54 is a "sliceform," which may include a first plurality of planar elements coupled to a second plurality of planar elements. These elements are configured to move between a substantially two-dimensional, collapsed state and a substantially three-dimensional, expanded state. A variety of paper mechanics can be used to move the sliceform between states.

The mounting substrate 50, first and second sheets 56 and 58 of the foldable substrate 52, and decorative card element may be formed from paper, cardstock, or any other suitable material.

Figure 16:
FIG. 16 is a perspective view of a second greeting card in accordance with the invention described herein.
Figure 17:
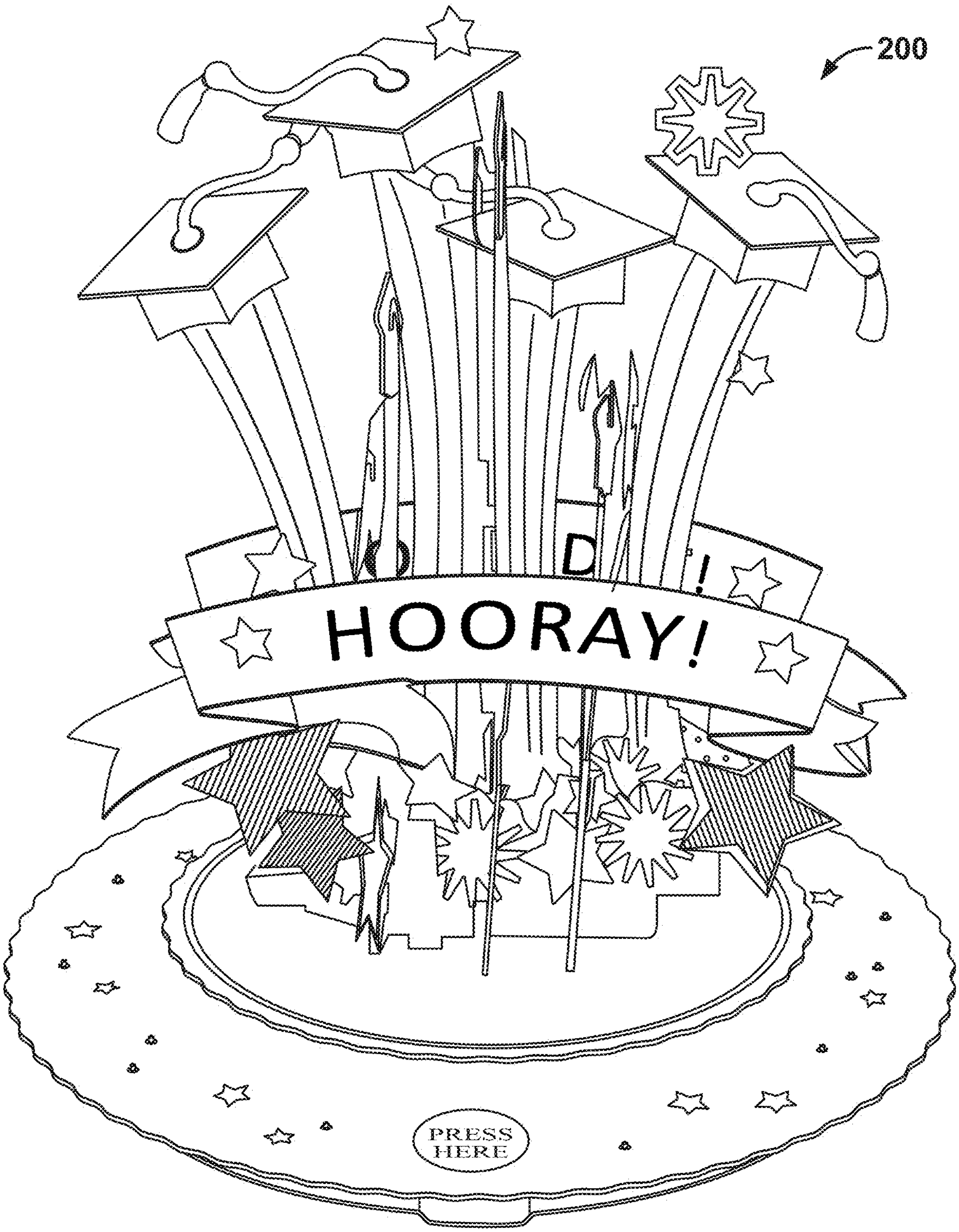
FIG. 17 is a perspective view of a third greeting card in accordance with the invention described herein showing a pop-up assembly of the greeting card in an expanded position.
Figure 18:
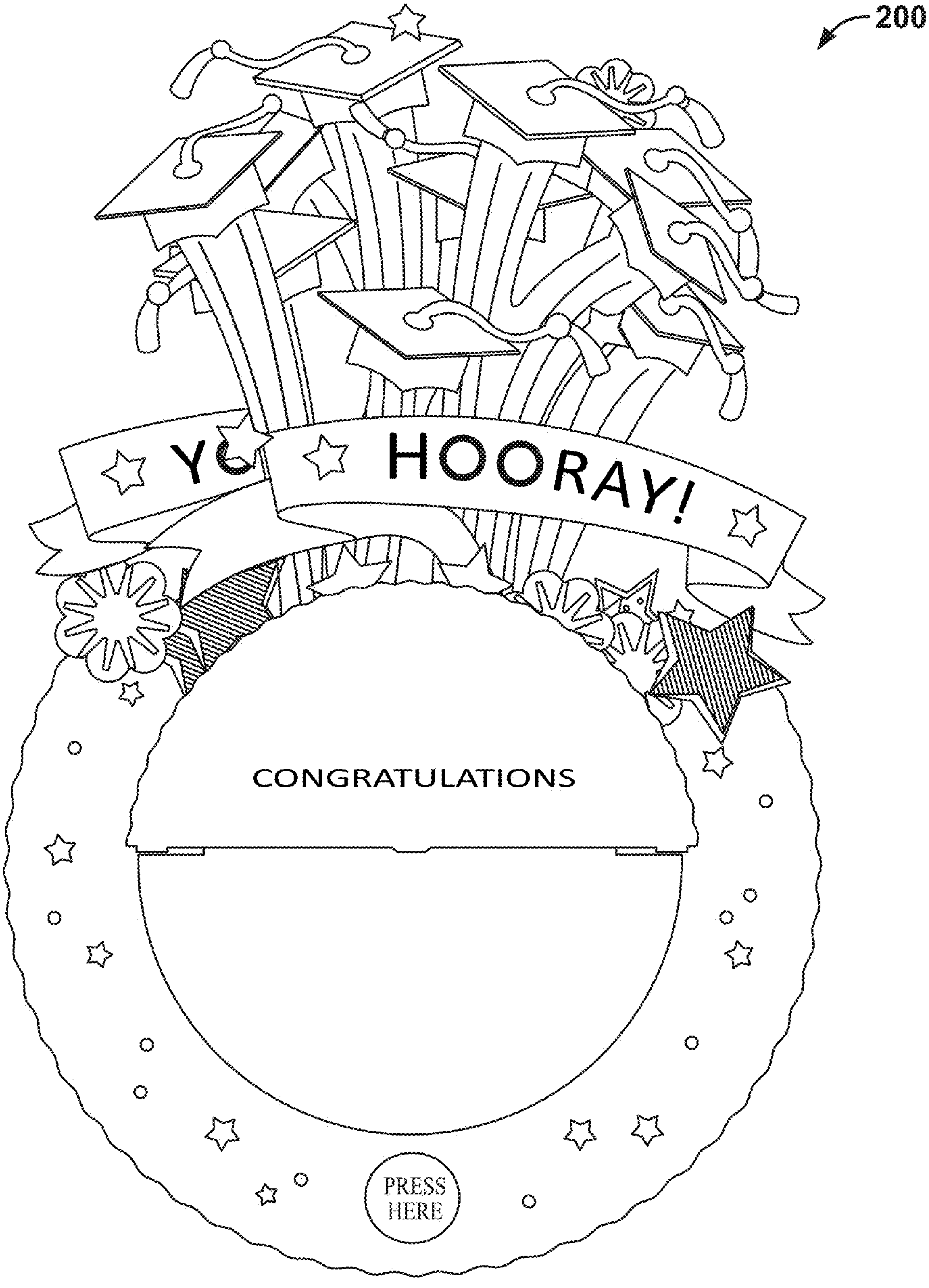
FIG. 18 is a top plan view of the third greeting card showing the pop-up assembly in a collapsed position.
Figure 19:
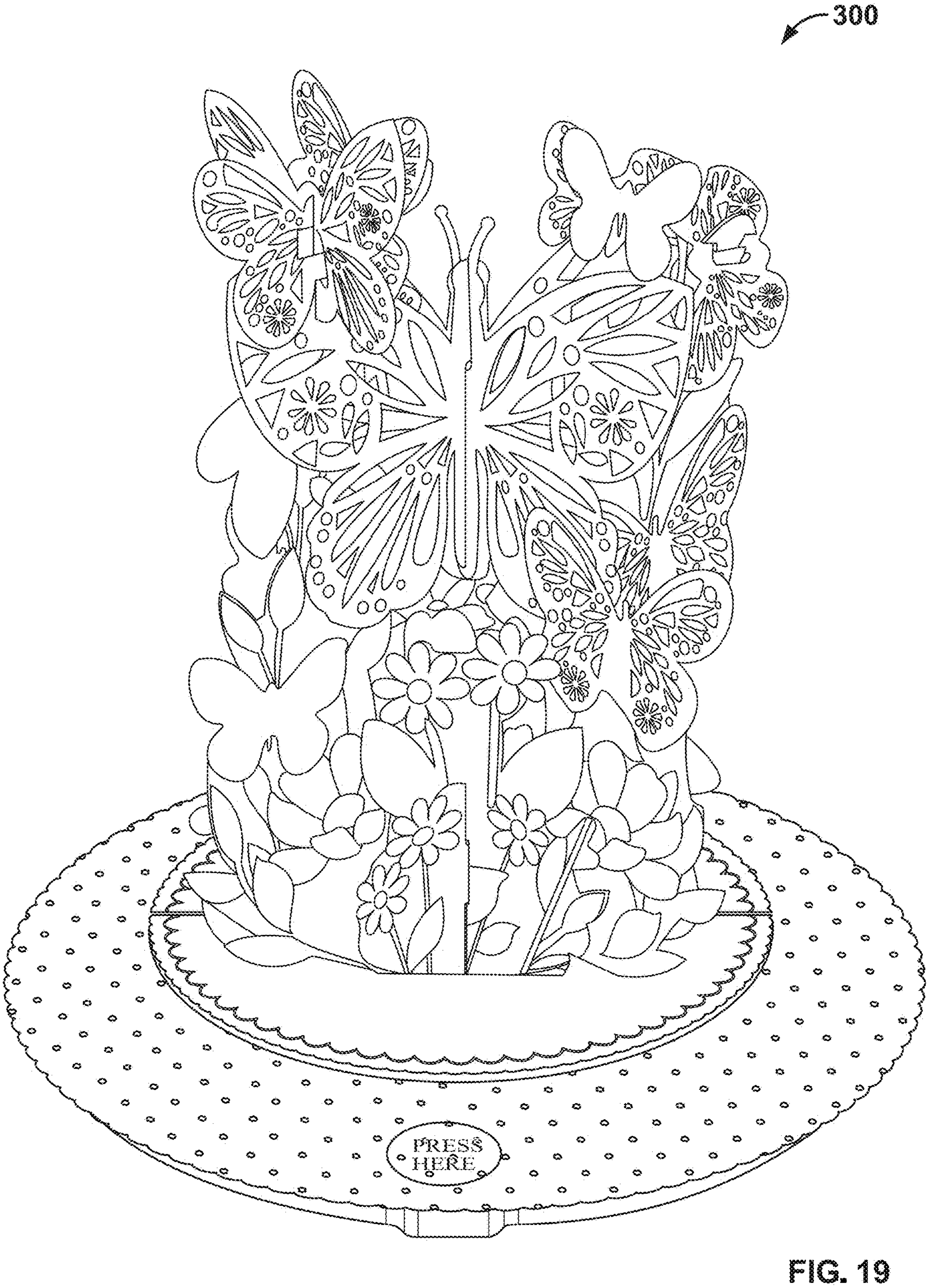
FIG. 19 is a perspective view of a fourth greeting card in accordance with the invention described herein showing a pop-up assembly of the greeting card in an expanded position.
Figure 20:
FIG. 20 is a top plan view of the fourth greeting card showing the pop-up assembly in a collapsed position.

Alternative embodiments of decorative items in accordance with the invention described and claimed herein are shown in FIGS. 16-20. Each of these decorative items may also be greeting cards, although as described above, a variety of decorative items having different types of foldable panels are within the scope of the invention. Further, each of these alternative embodiments is designed to have a base, a motor mounted to the base, and a pop-up assembly coupled to the motor, wherein the motor is operable to rotate the pop-up assembly with respect to the base, and the pop-up assembly is movable between collapsed and expanded positions. For example, FIG. 16 shows a decorative item 100 with a decorative card element designed to resemble a trophy with wording that may be appropriate as a Father's Day card. FIGS. 17 and 18 show a decorative item 200 with a decorative card element designed to resemble graduation caps flying through the air and with wording that may be appropriate as a Graduation Day card. FIG. 17 shows the decorative item 200 in the expanded position and FIG. 18 in the collapsed position. Notably, the graduation caps are visible and convey the same general impression in the collapsed position as in the expanded position. Finally, FIGS. 19 and 20 show a decorative item 300 with a decorative card element designed to resemble butterflies flying above flowers and with wording that may be appropriate as a Mother's Day card. FIG. 19 shows the decorative item 300 in the expanded position and FIG. 20 in the collapsed position. Notably, the butterflies and flowers are visible and convey the same general impression in the collapsed position as in the expanded position.

Figure 21:
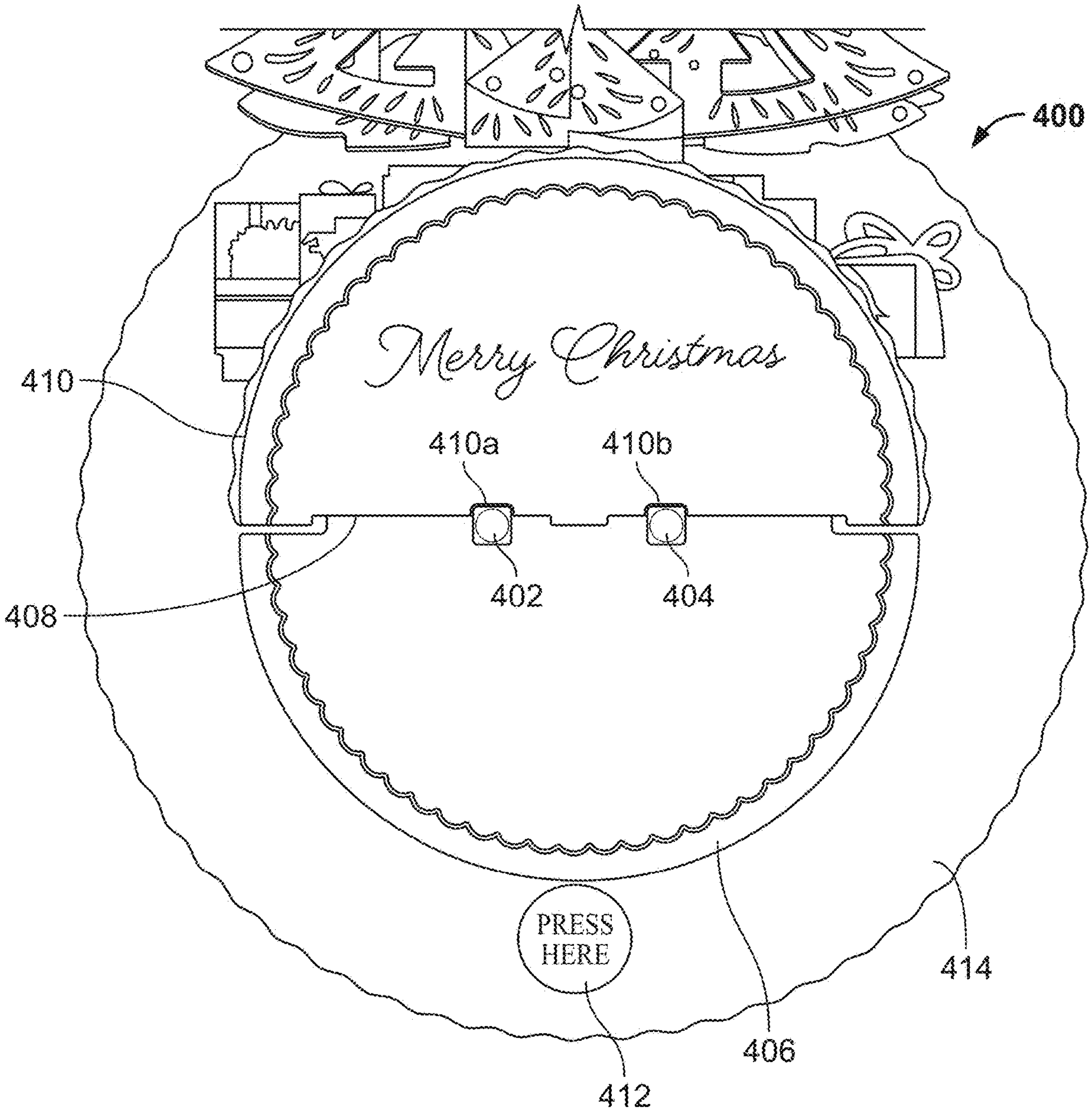
FIG. 21 is a top plan view of a fifth greeting card in accordance with the invention described herein showing a pop-up assembly in a collapsed position and lights mounted to a mounting substrate of the pop-up assembly.
Figure 22:
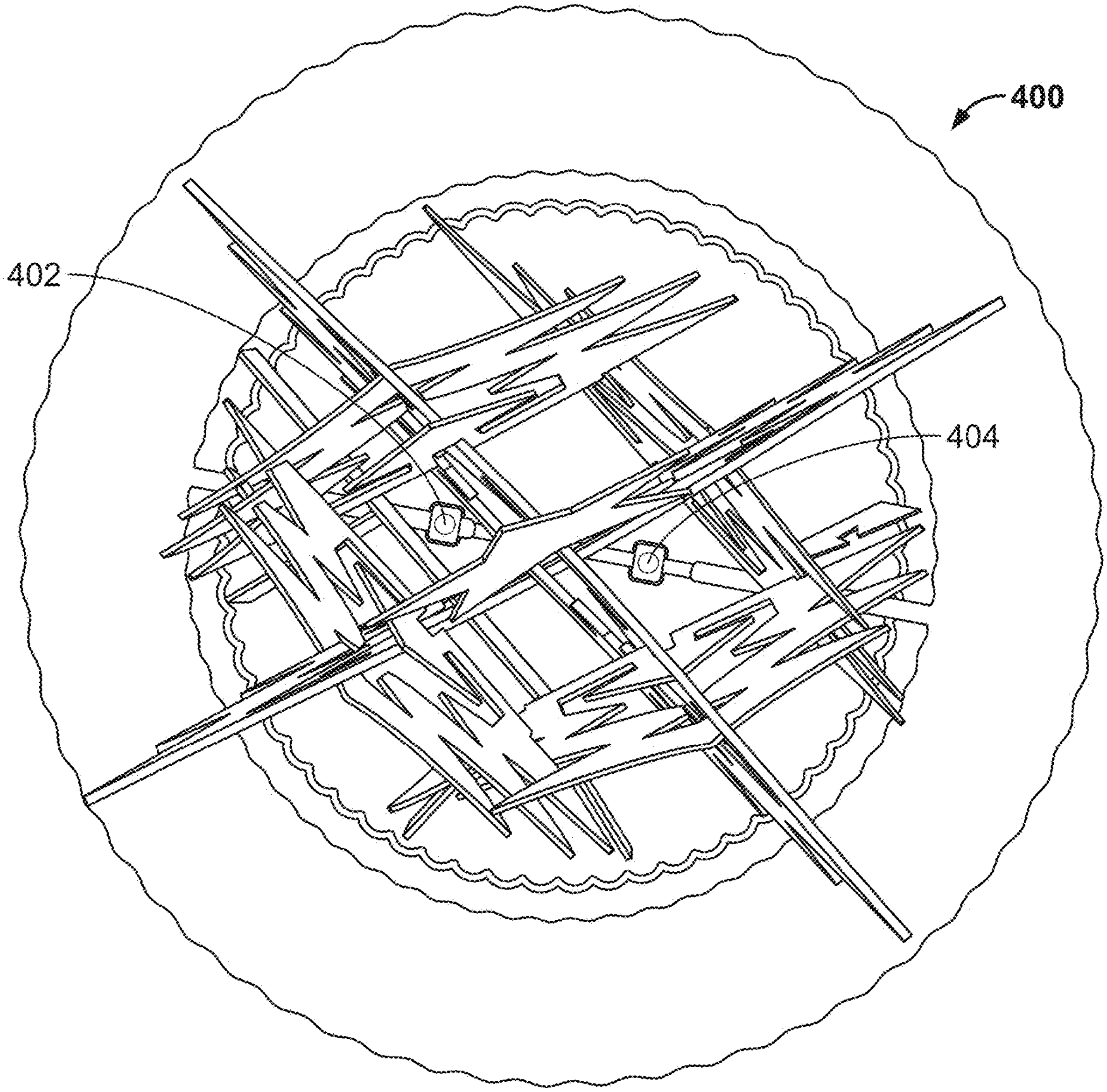
FIG. 22 is a top plan view of the fifth greeting card showing the pop-up assembly in an expanded position.

Another embodiment of decorative item in accordance with the invention described and claimed herein is identified in FIGS. 21 and 22 as 400. The decorative item 400 is substantially similar to the decorative item 10 shown in FIGS. 1-15 except that it has lights 402 and 404 mounted on the mounting substrate 406. The lights 402, 404 may be LED lights and are mounted to the mounting substrate 406 along a midline of the mounting substrate 406 below a fold 408 of the foldable substrate 410. The foldable substrate 410 has openings 410*a-b* that generally match the size of the lights 402 and 404. The lights 402, 404 may emit light through the openings 410*a-b* when the foldable substrate 410 is in the expanded position shown in FIG. 22.

The lights 402, 404 may be powered by any suitable means. For example, the lights 402, 404 may be powered by one or more batteries (not shown) mounted to an underside of the mounting substrate 406. Holes in the mounting substrate 406 may receive wires connected to the lights 402, 404 and batteries. The lights 402, 404 may be configured and operable to turn on and emit light when sensing movement or sound (e.g., when the button 412 is pressed and the mounting substrate 406 begins to rotate or sound is emitted from the speaker 40 (FIG. 5) as described above in connection with decorative item 10).

Further, the lights 402, 404 may be connected to the circuit board 38 (FIG. 5) positioned within the base 414 by wires extending through openings in the mounting substrate 406 and base 414. In this manner, the lights 402, 404 may be powered on by the circuit board 38 when the button 412 is pressed causing the lights 402, 404 to emit light. Thus, the lights 402, 404 may emit light at or around the same time that the mounting substrate 406 begins to rotate and sound is emitted from the speaker 40. Batteries mounted on the circuit board 38 may power the lights 402, 404. The pop-up assembly 416 of the decorative item 400 may also include translucent, transparent, or other types of materials designed to interact with the light emitted from the lights 402, 404.

Figure 23:
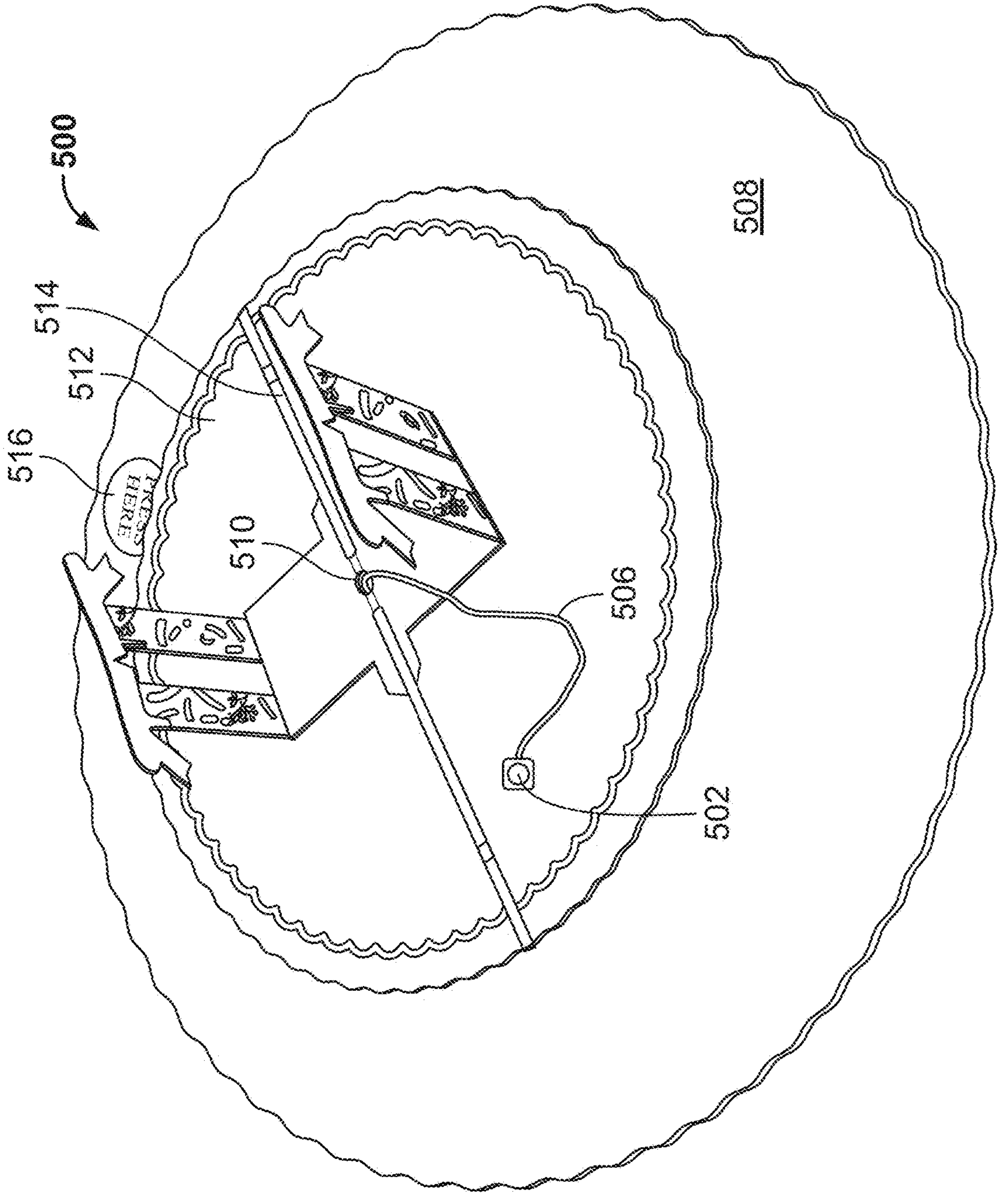
FIG. 23 is a perspective view of a portion of a sixth greeting card in accordance with the invention described herein showing a portion of a pop-up assembly in an expanded position and a light connected to a wire.
Figure 24:
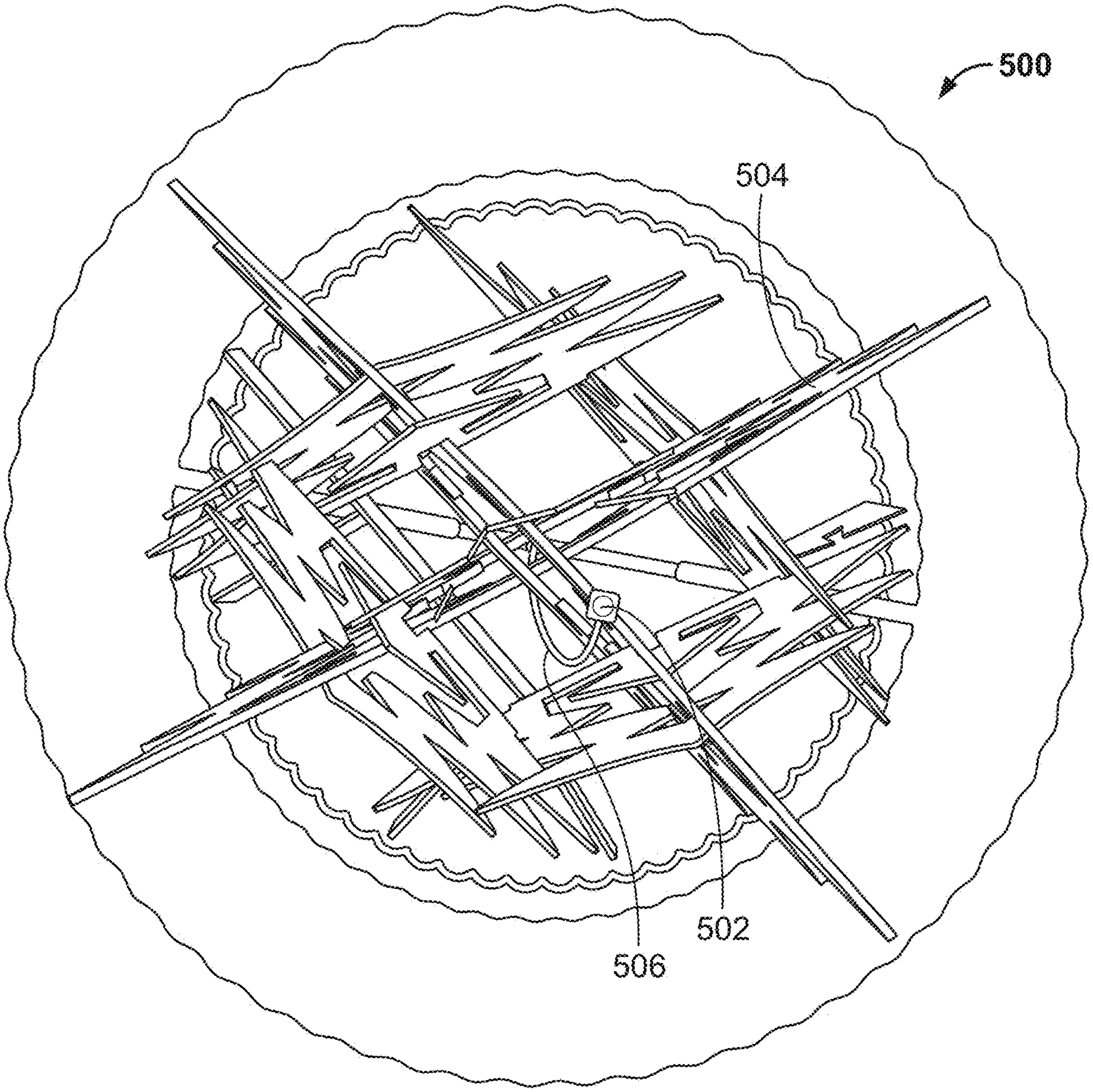
FIG. 24 is a top plan view of the sixth greeting card showing the pop-up assembly in an expanded position.

FIGS. 23 and 24 show another alternative embodiment of decorative item 500 having at least one light 502. The decorative item 500 is substantially similar to the decorative item 10 shown in FIGS. 1-15 except that it has light 502. In FIG. 23, the pop-up assembly of the decorative item 500 is not shown so that details of the light 502 are more easily visible. The light 502 may be an LED light. The light 502 may be mounted to any desired portion of the pop-up assembly 504 (FIG. 24). A wire 506 connects the light 502 to the circuit board 38 (FIG. 5) positioned in the base 508. The wire 506 extends from the light 502 through a hole 510 in the center of the foldable substrate 512 and mounting substrate 514. The wire 506 may further extend through an opening in the base 508 to connect to the circuit board 38 (FIG. 5). In one embodiment, the drive shaft 20 may be configured to have an opening through it for receiving the wire 506 so that the drive shaft 20 rotates around the wire 506 and does not twist or otherwise affect the wire when the drive shaft 20 and pop-up assembly 504 rotate.

As shown in FIG. 24, the light 502 is mounted to the pop-up assembly 504 near a midpoint of the pop-up assembly 504 above the hole 510. The wire 506 extends upward from the hole 510 to the light 502 when the pop-up assembly 504 is in the expanded position. The wire 506 is flexible allowing the pop-up assembly 504 to move between its collapsed and expanded positions. The light 502 is mounted to a midpoint of the pop-up assembly 504 to avoid twisting of the wire 506 as the pop-up assembly 504 rotates. Similar to the lights 402, 404 described above, the light 502 may emit light when sensing movement or sound, or when the button 516 (FIG. 23) is pressed and the pop-up assembly 504 also begins to rotate. The light 502 may be powered by one or more batteries, including batteries mounted on the circuit board 38. The decorative item 500 may include multiple lights like light 502 mounted to different portions of the pop-up assembly 504. The pop-up assembly 504 of the decorative item 500 may also include translucent, transparent, or other types of materials designed to interact with the light emitted from the light 502. Any of the decorative items 10, 100, 200, 300, 600, 700, or 800 described herein may be modified to have lights as shown in FIG. 21-22 or 23-24.

Figure 25:
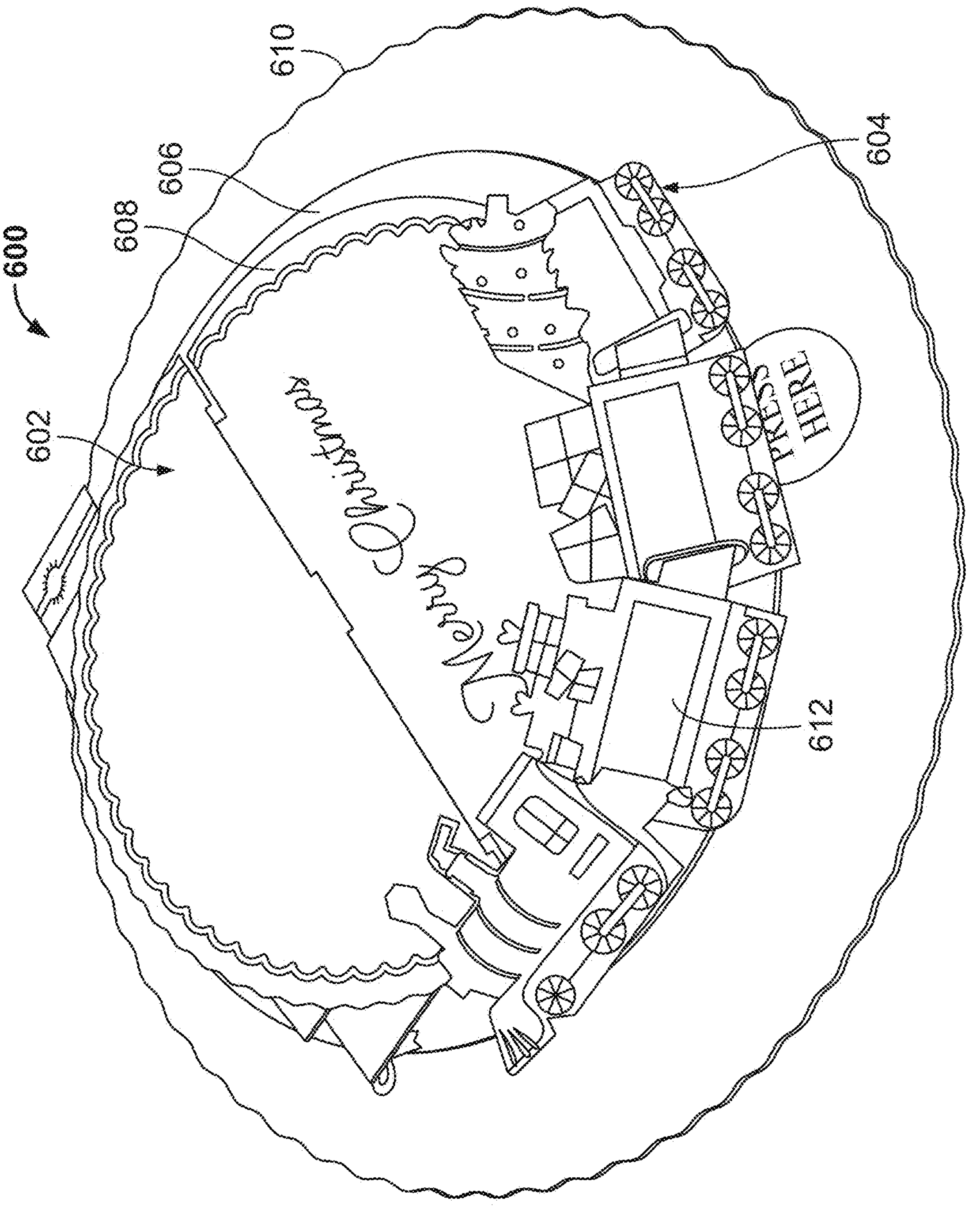
FIG. 25 is a perspective view of a seventh greeting card in accordance with the invention described herein showing first and second pop-up assemblies each in a collapsed position.
Figure 26:
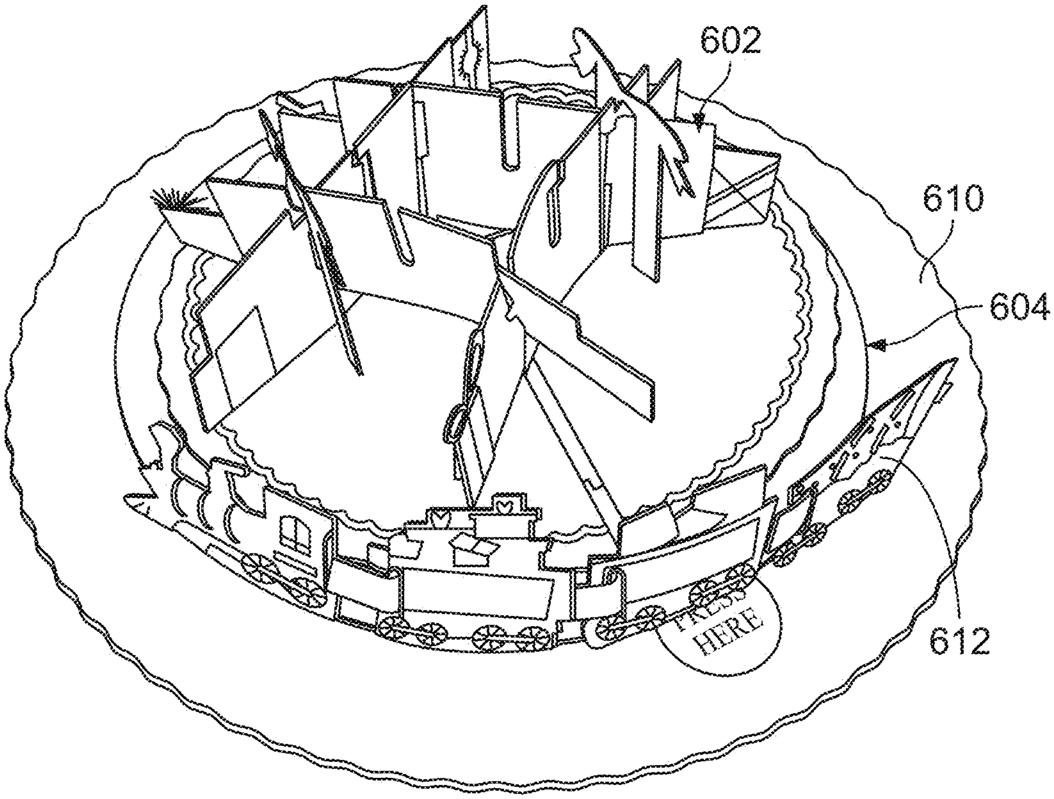
FIG. 26 is a perspective view of the seventh greeting card showing the first and second pop-up assemblies in an expanded position.
Figure 27:
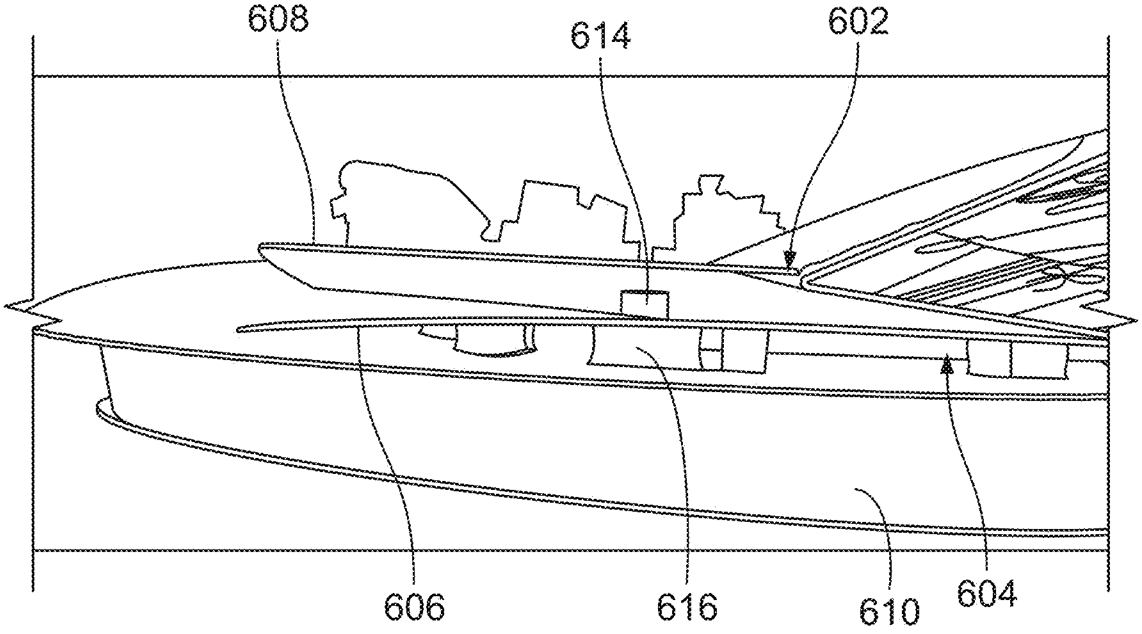
FIG. 27 is a side elevational view of the seventh greeting card.

FIGS. 25-27 show another alternative embodiment of decorative item 600 in accordance with the invention described herein. The decorative item 600 is similar to the decorative item 100 described above except that the decorative item 600 includes a first pop-up assembly 602 and a second pop-up assembly 604. The first pop-up assembly 602 is substantially similar to the pop-up assembly 12 described above. The second pop-up assembly 604 includes a mounting substrate 606 that is positioned between a mounting substrate 608 of the first pop-up assembly 602 and a base 610. The base 610 is substantially similar to the base 14 described above. The mounting substrate 606 of the second pop-up assembly 604 has a diameter that is slightly larger than the diameter of the mounting substrate 608 of the first pop-up assembly.

A decorative card element 612 is mounted to the mounting substrate 606 of the second pop-up assembly 604. The decorative card element 612 is movable with respect to the mounting substrate 606 between the collapsed position shown in FIG. 25 and the expanded position shown in FIG. 26. When the first and second pop-up assemblies 602 and 604 are in their respective collapsed positions as shown in FIG. 25, the decorative item 600 is substantially two-dimensional and suitable for insertion in an envelope for mailing. When the first and second pop-up assemblies 602 and 604 are in their respective expanded positions as shown in FIG. 26, the decorative item 600 is substantially three-dimensional with the pop-up assemblies extending upward above the base 610. The first pop-up assembly 602 is only partially shown in FIG. 26, but may have the same decorative card element 54 as shown in FIG. 2. The first pop-up assembly 602 may be movable between its collapsed and expanded positions in the same manner as the pop-up assembly 12 described above. The second pop-up assembly 604 may be movable between its collapsed and expanded positions by grasping the decorative card element 612 and rotating it between the two positions.

As shown in FIG. 27, there is a first drive shaft 614 extending upward from the base 610 to the first pop-up assembly 602. The first pop-up assembly 602 may have a shaft coupler that mounts to the first drive shaft 614 similar to the shaft coupler 74 described above. A second drive shaft 616 extends from the base 610 to the second pop-up assembly 604. The second pop-up assembly 604 may have a shaft coupler similar to the shaft coupler 74 that connects the second pop-up assembly to the second drive shaft 616. The first and second drive shafts 614 and 616 may be connected to a motor within the base 610 similar to the motor 22 described above. If both drive shafts 614 and 616 are connected to the motor, the drive shafts 614 and 616 may be configured to rotate at the same time, at the same speed, and/or in the same direction, or the drive shafts 614 and 616 may be configured to rotate at different times, at different speeds, and/or in different directions. For example, in one configuration the drive shafts 614 and 616 may be connected to each other in a manner that causes both to rotate at the same time, speed, and direction when the motor 22 is powered on. In another configuration, one of the drive shafts 614 and 616 may be directly connected to the motor 22, and the drive shafts 614 and 616 may be connected to each other with one or more gears. In this manner, rotation of one of the drive shafts 614 and 616 via the motor 22 will cause rotation of the other of the drive shafts 614 or 616 via the geared arrangement. The gears may be configured so that the pop-up assemblies 602 and 604 rotate at different speeds and/or in different directions.

In another configuration, only one of the drive shafts 614 and 616 may be connected to the motor 22 for rotation while the other of the drive shafts 614 and 616 remains stationary. For example, the drive shaft 614 may be stationary while the drive shaft 616 is connected to the motor 22. In this configuration, the second pop-up assembly 604 is operable to rotate while the first pop-up assembly 602 remains stationary. As shown in FIGS. 25 and 26, the second pop-up assembly 604 has a decorative card element 612 resembling a train, and the decorative card element 612 is positioned radially outward from the outer peripheral edge of the first pop-up assembly 602. The first pop-up assembly 602 resembles a Christmas tree when in the expanded position, similar to the pop-up assembly 12 shown in FIG. 1. In this configuration, the decorative card element 612 or train may rotate around the Christmas tree of the first pop-up assembly 602 when both pop-up assemblies 602 and 604 are in their expanded position and the motor is powered on to rotate the second pop-up assembly 604. To make the first pop-up assembly 602 stationary, the first drive shaft 614 may be mounted at one end to the base 610, and the first drive shaft 614 may extend upward through an opening extending through the second drive shaft 616. In this manner, the first and second drive shafts 614 and 616 are not connected together so that the second drive shaft 616 may rotate independently of the first drive shaft 614. Alternatively, the drive shafts 614 and 616 may be configured so that the second pop-up assembly 604 remains stationary while the first pop-up assembly 602 rotates.

In another configuration, the decorative item 600 may have two motors similar to the motor 22 described above. One of the motors may be connected to the first drive shaft 614 and another of the motors to the second drive shaft 616. The motors may be configured to rotate the first and second pop-up assemblies 602 and 604 at the same speed, time, and/or direction, or at different speeds, times, and/or directions.

Figure 28:
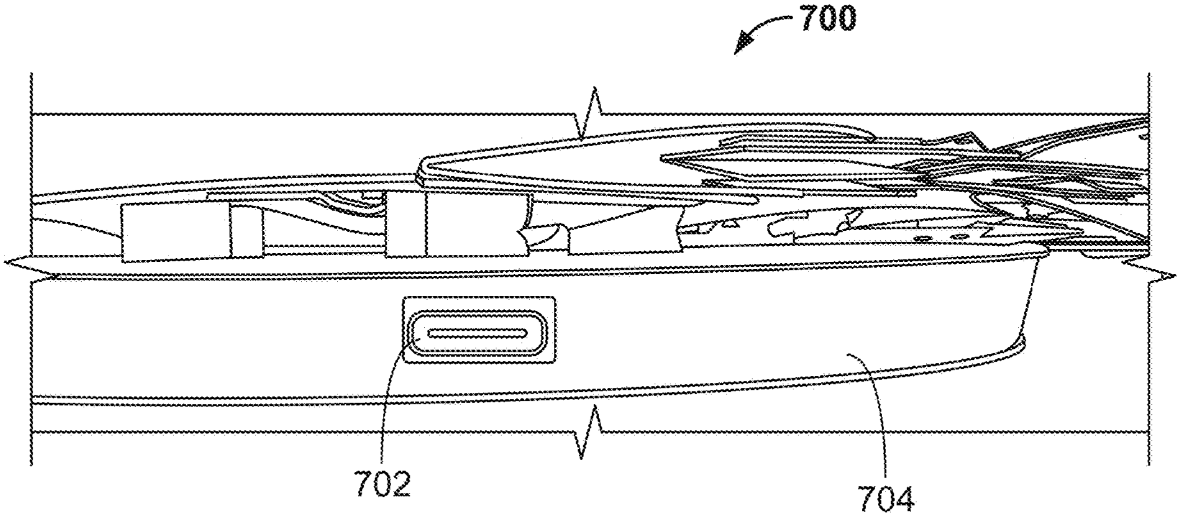
FIG. 28 is a side elevational view of an eighth greeting card in accordance with the invention described herein showing a power input port.
Figure 29:
FIG. 29 is a top plan view of a ninth greeting card in accordance with the invention described herein showing a pop-up assembly in a collapsed position.
Figure 30:
FIG. 30 is a perspective view of a front of the ninth greeting card showing the pop-up assembly in an expanded position.

FIG. 28 shows another alternative embodiment of decorative item 700 that includes a USB port 702 mounted to a side of a base 704. The decorative item 700 may include a circuit board with batteries, similar to the circuit board 38 described above. The USB port 702 may be connected to the circuit board and used to recharge the batteries by connecting a source of electrical power to the USB port 702. The USB port 702 may also be used to directly power the circuit board in embodiments not including batteries. The USB port 702 may be used to supply power to a motor and speaker connected to the circuit board similar to the motor 22 and speaker 40 described above. Further, the USB port 702 may be used to supply power to lights, similar to the lights 402, 404, or 502 described above. The USB port 702 may be used solely as a power input port, or alternatively it may also be used as a data port to send data to the circuit board or receive data from the circuit board. For example, the USB port 702 may be used to transmit an audio file to the circuit board that is played when a button on the decorative item 700 is pressed. Any of the embodiments of decorative items 10, 100, 200, 300, 400, 500, 600, or 800 described herein may include a USB port similar to USB port 702. The USB port 702 may be any type of USB port including a type A, B, or C USB port. Further, the USB port 702 may be replaced with any other type of electrical input port configured to send and/or receive power and/or data.

Figure 31:
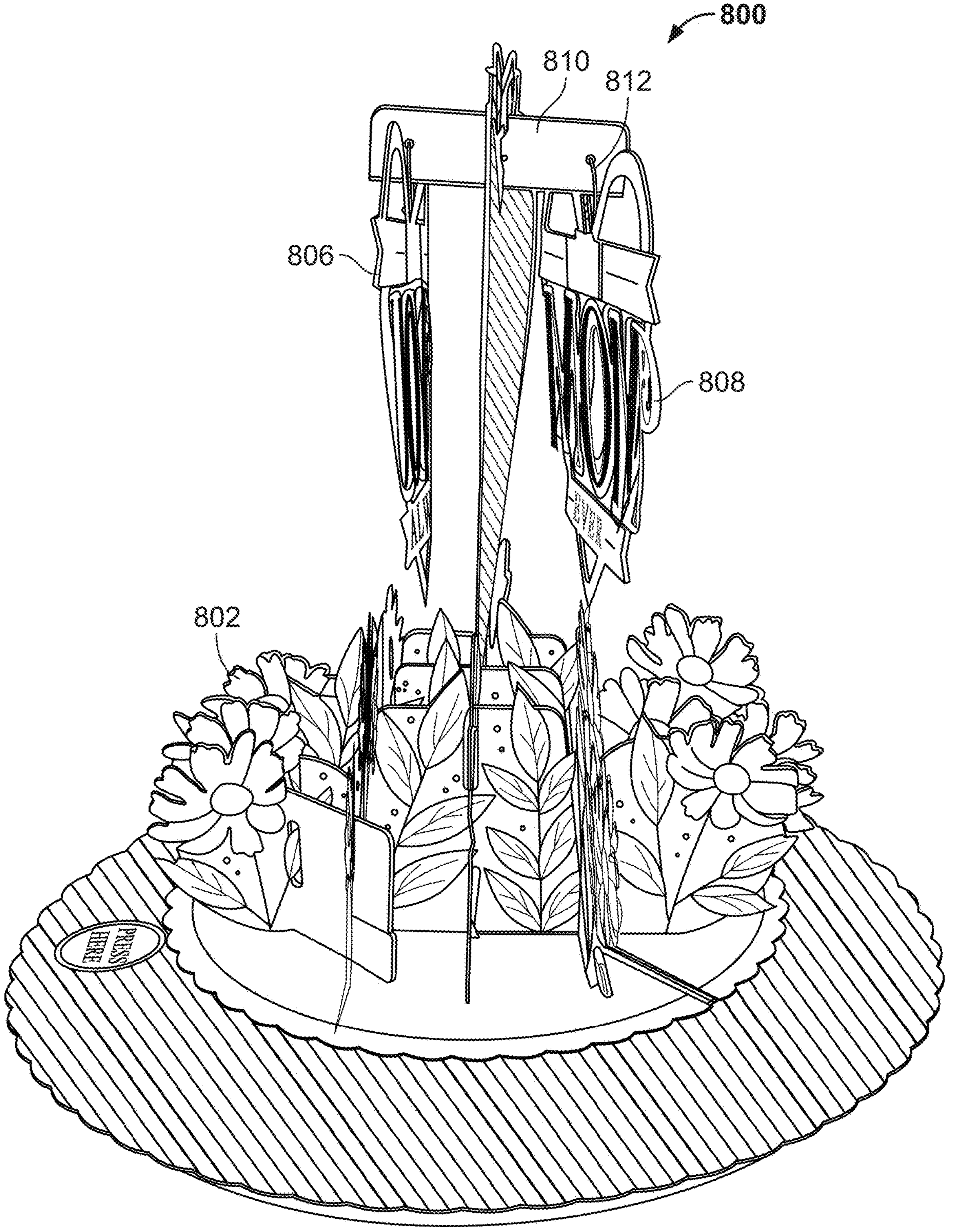
FIG. 31 is a perspective view of a side of the ninth greeting card.

FIGS. 29-32 show another embodiment of decorative item 800 in accordance with the invention described herein. Other than having a different decorative card element 802, as described below, the decorative item 800 may be substantially similar to the decorative item 10 or any of the other decorative items described above. The decorative item 800 has a pop-up assembly 804 movable between the collapsed position shown in FIG. 29 and the expanded position shown in FIGS. 30-32. As best shown in FIG. 31, the decorative card element 802 includes decorations 806 and 808 that are mounted to hang from a sheet 810 of the decorative card element 802. The decorations 806 and 808 may each be mounted to the sheet 810 with a string or wire loop, one of which is shown as 812, that passes through holes in the sheet 810 and respective decoration 806, 808. When mounted in this manner, the decorations 806, 808 hang from the sheet 810 and can rotate or move to a certain extent with respect to the sheet 810.

Figure 32:
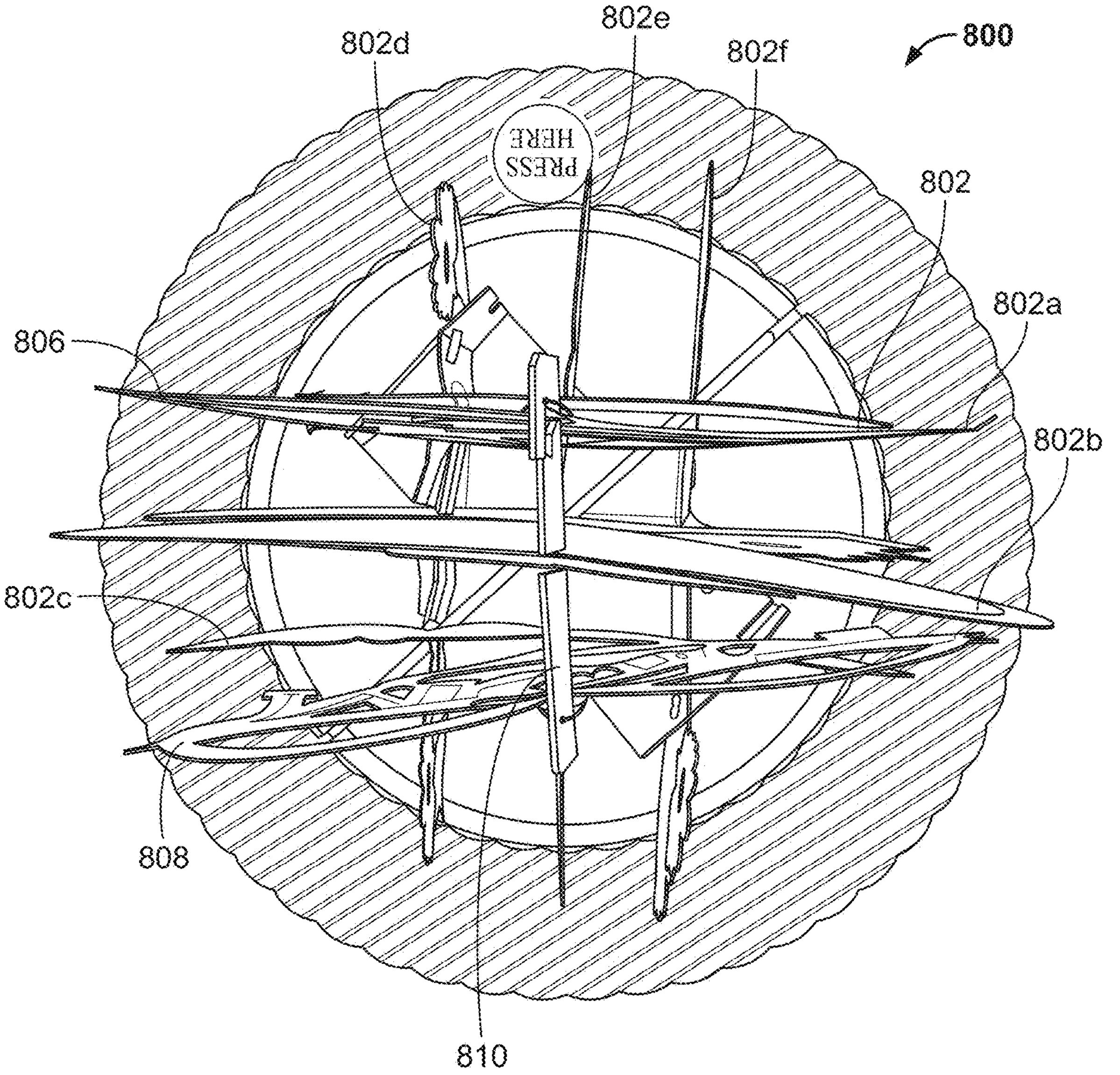
FIG. 32 is a top plan view of the ninth greeting card.

Referring to FIG. 32, the decorative card element 802 is formed similar to the decorative card element 54 described above from a plurality of sheets 802*a-f* that are interlocked together. The sheet 810 is mounted within a slot at the top of the sheet 802*b* and the hanging decorations 806, 808 are generally positioned to hang downward from the sheet 810 above the sheets 802*a* and 802*c*, respectively.

In use, a person may write a message and/or their name on a portion of the decorative item 10. The decorative item 10 may be moved to the collapsed position and inserted in an envelope of appropriate size, which is delivered to a recipient of the item. The recipient may display the decorative item 10 on any desired surface and move the pop-up assembly 12 to the expanded position shown in FIG. 1. The switch 42 may be pressed at any time to rotate the entire pop-up assembly 12 with respect to the base 14 and play music, which may be a holiday tune, or any other sound, including a recorded message from the person that gifted the item. The decorative items 100, 200, 300, 400, 500, 600, 700, and 800 may be used in a similar manner as decorative item 10.

From the foregoing it will be seen that this invention is one well adapted to attain all ends and objectives hereinabove set forth, together with the other advantages which are obvious and which are inherent to the invention.

Since many possible embodiments may be made of the invention without departing from the scope thereof, it is to be understood that all matters herein set forth or shown in the accompanying drawings are to be interpreted as illustrative, and not in a limiting sense.

While specific embodiments have been shown and discussed, various modifications may of course be made, and the invention is not limited to the specific forms or arrangement of parts and steps described herein, except insofar as such limitations are included in the following claims. Further, it will be understood that certain features and subcombinations are of utility and may be employed without reference to other features and subcombinations. This is contemplated by and is within the scope of the claims.

What is claimed and desired to be secured by Letters Patent is as follows:

1. A decorative item comprising:

a base;

a motor mounted to the base; and a pop-up assembly coupled to the motor, the motor operable to rotate the pop-up assembly with respect to the base, the pop-up assembly movable between a collapsed position, in which the pop-up assembly is generally two-dimensional, and an expanded position, in which at least a portion of the pop-up assembly is generally three-dimensional, extends outward from the base, and occupies a volume of space adjacent the base, wherein the pop-up assembly comprises:

a foldable substrate comprising first and second panels with a fold positioned between the first and second panels, the second panel configured to move relative to the first panel about the fold to move the pop-up assembly between the collapsed and expanded positions; and a decorative card element coupled to the foldable substrate, the decorative card element being generally two-dimensional and at least partially positioned between the first and second panels when the pop-up assembly is in the collapsed position, and the decorative card element being generally three-dimensional and extending outward from the first and second panels when the pop-up assembly is in the expanded position.

2. The decorative item of claim 1, wherein the decorative card element is a sliceform.

3. The decorative item of claim 2, wherein the foldable substrate comprises first and second tabs each having a slot that receives a portion of the sliceform.

4. The decorative item of claim 2, wherein a decoration is mounted to hang from a portion of the sliceform.

5. The decorative item of claim 1, wherein the first panel has top and bottom faces, and wherein the second panel has top and bottom faces, wherein the top face of the second panel is positioned adjacent and above the top face of the first panel when the pop-up assembly is in the collapsed position, and wherein the top face of the second panel is positioned adjacent and to the side of the top face of the first panel when the pop-up assembly is in the expanded position.

6. The decorative item of claim 1, wherein the foldable substrate comprises a first sheet and a second sheet adhered to the first sheet, wherein the first and second sheets form the first and second panels.

7. The decorative item of claim 6, wherein the first sheet comprises the fold, and wherein the second sheet is separated into two discrete portions positioned on opposite sides of the fold from each other.

8. The decorative item of claim 1, wherein at least a portion of the decorative card element extends outward from the first and second panels when the pop-up assembly is in the collapsed position.

9. The decorative item of claim 1, further comprising a light mounted to the decorative card element, the light configured to emit light when the motor rotates the pop-up assembly, and wherein a wire extends from the light to the base.

10. The decorative item of claim 1, wherein the pop-up assembly is generally planar and parallel to the base when it is in the collapsed position.

11. The decorative item of claim 1, further comprising a light mounted to the pop-up assembly, the light configured to emit light when the motor rotates the pop-up assembly.

12. The decorative item of claim 1, further comprising a second pop-up assembly coupled to the base, the second pop-up assembly movable between a collapsed position, in which the pop-up assembly is generally two-dimensional, and an expanded position, in which at least a portion of the second pop-up assembly is generally three-dimensional, extends outward from the base, and occupies a volume of space adjacent the base.

13. The decorative item of claim 12, wherein the second pop-up assembly is configured to rotate with respect to the base.

14. The decorative item of claim 12, wherein the second pop-up assembly is fixedly mounted to the base.

15. The decorative item of claim 14, wherein the pop-up assembly comprises a mounting substrate and a decorative card element mounted to the mounting substrate, wherein the decorative card element is configured to rotate around the second pop-up assembly when the pop-up assembly and the second pop-up assembly are both in the expanded position.

16. A decorative item comprising:

a base;

a motor mounted to the base;

a pop-up assembly coupled to the motor, the motor operable to rotate the pop-up assembly with respect to the base, the pop-up assembly movable between a collapsed position, in which the pop-up assembly is generally two-dimensional, and an expanded position, in which at least a portion of the pop-up assembly is generally three-dimensional, extends outward from the base, and occupies a volume of space adjacent the base; and a second pop-up assembly coupled to the base, the second pop-up assembly movable between a collapsed position, in which the pop-up assembly is generally two-dimensional, and an expanded position, in which at least a portion of the second pop-up assembly is generally three-dimensional, extends outward from the base, and occupies a volume of space adjacent the base, wherein the second pop-up assembly is configured to rotate with respect to the base.

17. A decorative item comprising:

a base;

a motor mounted to the base;

a pop-up assembly coupled to the motor, the motor operable to rotate the pop-up assembly with respect to the base, the pop-up assembly movable between a collapsed position, in which the pop-up assembly is generally two-dimensional, and an expanded position, in which at least a portion of the pop-up assembly is generally three-dimensional, extends outward from the base, and occupies a volume of space adjacent the base; and a second pop-up assembly coupled to the base, the second pop-up assembly movable between a collapsed position, in which the pop-up assembly is generally two-dimensional, and an expanded position, in which at least a portion of the second pop-up assembly is generally three-dimensional, extends outward from the base, and occupies a volume of space adjacent the base, wherein the second pop-up assembly is fixedly mounted to the base, and wherein the pop-up assembly comprises a mounting substrate and a decorative card element mounted to the mounting substrate, wherein the decorative card element is configured to rotate around the second pop-up assembly when the pop-up assembly and the second pop-up assembly are both in the expanded position.

* * * * *